US006240073B1

(12) United States Patent
Reichman et al.

(10) Patent No.: US 6,240,073 B1
(45) Date of Patent: May 29, 2001

(54) REVERSE LINK FOR A SATELLITE COMMUNICATION NETWORK

(75) Inventors: Arie Reichman, Kfar Saba; Shaul Laufer, Tel Aviv; Avi Barda, Hod Hasharon; Sorin Goldenberg, Jerusalem, all of (IL)

(73) Assignee: Shiron Satellite Communications (1996) Ltd., Petach Tikva (IL)

( * ) Notice: Subject to any disclaimer, the term of this patent is extended or adjusted under 35 U.S.C. 154(b) by 0 days.

(21) Appl. No.: 08/970,922

(22) Filed: Nov. 14, 1997

(51) Int. Cl.[7] .................................................. H04J 13/06
(52) U.S. Cl. ............................ 370/319; 370/437; 375/202
(58) Field of Search ...................................... 370/352, 353, 370/354, 355, 356, 335, 342, 368, 365, 465, 319, 431, 433, 437, 320, 321, 343, 478, 436; 375/202, 205, 201

(56) References Cited

PUBLICATIONS

J.L. Massey, Some New Approaches To Random—Access Communications, Reprinted from Performance '87, pp. 551–569,1988 'P.J. Courtois and G.Latouche, Eds. New York : Elsevier Science, 1998,pp.354–368.

J.L Massey and P. Mathys, "The Collision Channel Without Feedback," IEEE Trans. Inform. Theory, vol.IT–31, pp.192–204, Mar. 1985.

N. Abramson, "Multiple Access in Wireless Digital Networks," Proceedings of the IEEE, vol. 82 No. 9 Sep. 1994 pp. 1360–1370.

N. Abramson, VSAT Data Networks, in Proc. IEEE. vol. 78, No. 7, Jul. 1990, pp.1267–1274.

M.B.Pursley , "Frequency—Hop Transmission for Satellite Packet Switching and Terrestrial Packet Radio Networks," IEEE Transactions on Information Theory, vol. IT–32, No. 5, Sep. 1986, pp 652–667.

K.Yang . and G. L. Stuber, "Throughput Analysis Of The Slotted Frequency –Hop Multiple–Access Network," IEEE Journal on Selected Areas in Communications. vol. 8. No. 4, May 1990.,pp 588–601.

S. W. Kim and W. Stark, Optimum Rate Reed—Solomon Codes For Frequency Hopped Spread Spectrum Multiple Access Communication Systems. IEEE Transactions on Communications, vol. 37,No2 Feb. 1989, pp 138–144.

Amir M. Y. Bigloo, T. A Gulliver and V.K. Bhargava, "A Slotted Frequency –Hopped Multiple–Access Network with Packet Combining," IEEE Journal of Selected Areas in Communications, vol. 14, No. 9, Dec. 1996,pp 1859–1865.

(List continued on next page.)

*Primary Examiner*—Huy D. Vu
(74) *Attorney, Agent, or Firm*—Darby & Darby

(57) ABSTRACT

The present invention is a return link for a satellite communication system. The return link described herein is suitable for use in any type of communications network such as networks used for Internet access purposes. The return link in combination with a forward link forms a complete two way communication system via satellite. The return link comprises two separate communication schemes used in combination to implement the return link of the satellite system. The first communication scheme uses a random access method based on a non synchronous frequency hopping code division multiple access technique (NS/FH/CDMA). The second communication scheme uses a channel assignment method based on a frequency division multiple access (FDMA) technique. Data generated by a user is transmitted utilizing one of the two communication schemes in accordance with the content and amount of data generated. Messages requiring a relatively low transmission rate, such as short bursty messages, utilize the random access transmission method. On the other hand, messages requiring a higher transmission rate, such as video conferencing, utilize the channel assignment method.

36 Claims, 13 Drawing Sheets

OTHER PUBLICATIONS

ETS 300 421 "Digital Broadcasting Systems for Television, Sound and Data Services; Framing Structure, Channel Coding and Modulation for 11/12 GHz Satellite Services" Dec., 1994 pp 1003–1011.

S. B. Wicker V. K. Bhargava, "Reed Solomon Codes and Their Applications", chapter 6 IEEE Press, 1992.

S. Laufer and J. Snyders, Feedforward Multiple Access Satellite Communications, IEEE Journal On Selected Areas In Communications, vol. 10, No.6, Aug. 1992.

REVERSE LINK FOR A SATELLITE COMMUNICATION NETWORK

FIELD OF THE INVENTION

The present invention relates generally to satellite communications and more particularly relates to a satellite based multiple access reverse communication link suitable for an Internet access network.

BACKGROUND OF THE INVENTION

Currently, communication systems around the world are growing rapidly due to the increasing need for data communication bandwidth. In particular, satellite communication systems are currently experiencing rapid growth due to growing customer demand for satellite based data communications. Most of the current demand and estimated future demand will be for Internet and other network based data communication applications. A major factor in these communication systems is the bandwidth capacity demanded by the user. Applications in widespread use today, such as video conferencing, LAN/WAN and document delivery require high speed forward and return link data capacities. Currently, however, these capabilities are not provided by present day Internet via satellite systems.

It is currently estimated that there are approximately 13 million hosts and 16 million users on the Internet. The growth rate has been approximately 10 million new users a year for the past four years. At the same time, the number of Intranets (Internet network protocols applied within an enterprise or company for sharing information) are growing at an even faster rate. Currently, accessing the Internet via satellite has gained recognition as a fast and reliable solution for fast Internet access. Current commercially available Internet via satellite solutions such as DirecPC are based on an asymmetrical approach in which the data link to the user is via satellite while the return link to the user is via telephone lines using commercially available telephony modems. The disadvantages of these asymmetrical systems is outlined below.

The asymmetric approach via satellite, in which the user receives data from the Internet via satellite, yet sends data to the Internet via telephone lines, does not take advantage of a major feature of satellite communications: wide area coverage. The asymmetric link is based on a terrestrial connection and therefore limits the ability of the fast connection to the Internet to those places in which telephone lines and Internet service providers are available and have sufficient grade of service.

The data rate of asymmetric Internet via satellite communication systems enables basically e-mail and browsing applications only. This structure is mainly targeted to consumer markets where the user is limited to sending data from their home at relatively low speeds. There are, however, many users such as small office/home office (SOHO) that desire high speed data communications in both directions yet cannot afford having dedicated lease lines for their Internet connection. In the United States alone there are approximately 3.5 million small businesses of which only 10% can justify an expensive leased line. Thus, there are a large group of users looking for an on demand economical, fast and reliable connection to the Internet with a grade of service similar to that of a leased line.

Typical applications that require high data rates in both directions include video conferencing, LAN/WAN systems, Internet applications, document delivery, audio applications such as Internet Phone, commercial web sites, net gaming, point of presence, terminal equipment, Net Meeting and collaboration software. All the above mentioned applications are currently not adequately served by the currently available asymmetric satellite communication solutions.

Spread spectrum communication systems have been used in a variety of fields for some time now. In spread spectrum communication systems, the bandwidth of the transmitted signal is much greater than the bandwidth of the information to be transmitted. The carrier signal in such systems is modulated by a function that serves to widen or spread the bandwidth of the signal for transmission. On the receive side, signal is remapped or decoded into the original information bandwidth to reproduce the desired output signal.

Spread spectrum systems can be categorized into direct sequence systems, frequency hopping systems, time hopping systems and hybrid systems which are combinations of the above three.

In frequency hopping systems a carrier frequency is shifted or hopped in discrete increments in a pattern dictated by a predetermined code or sequence, e.g., a pseudo noise sequence or code. The resulting consecutive and time sequential frequency pattern is called a hopping pattern and the duration of each hop frequency is called a chip. The transmitted information is embedded in the codes or embedded within each frequency in the carrier wave by a modulation scheme such as PSK or FSK.

In reproducing the information signal of the receiver a synchronization acquisition process is performed in which the code pattern utilized by the receiver is synchronized with the code pattern generated and used in the transmitter. Using this, de-spreading and demodulation are performed on the spread spectrum signal to extract the transmitted data. A local reference signal is used that has a frequency corresponding to the same code pattern used in the transmitter for every chip. The received signal and the local reference are mixed in order to perform a correlation or de-spreading process for converting the spread spectrum signal into a signal having a frequency bandwidth wide enough to extract the data information. More information describing the operation of spread spectrum systems can be found in "Spread Spectrum Systems," by R. C. Dixon published by John Wiley and Sons, Inc., 1976.

Multiple user systems use multiple access techniques to allow users to share resources such as time and frequency. When the traffic from each user in the network is approximately steady it is possible to divide a single high capacity multiple access channel into a plurality of smaller orthogonal channels corresponding to individual user requirements. This can be accomplished either on a frequency basis using FDMA, on a time basis using TDMA or using CDMA. In addition, various combinations of FDMA and TDMA can also be used to minimize cost in large networks. FDMA and TDMA techniques are suitable solutions as long the traffic from each user is relatively stable. CDMA is a multiple access technique which uses spread spectrum communications. CDMA communications can be synchronous if all users are mutually synchronized in time.

TDMA communication systems are also known for providing multiple access. Theses systems partition the channel time in a fixed predetermined manner. They are efficient when the user population includes only a relatively small number of users having high duty cycles. However, many modern communication systems need to provide communication among interactive data terminals which operate in low duty cycle burst modes. Thus, TDMA is not particularly suited to this kind of communication.

In the typical modern interactive network, however, the traffic from individual terminals in the system varies as a function of time due to random traffic demands by different users at each terminal. In addition, the set of terminals active in the network can vary from moment to moment. In such systems it may be desirable to assign channel capacity to users on demand by means of a demand assigned multiple access (DAMA) architecture. In a DAMA system a separate channel called the request channel is used by individual users to request capacity as needed. The capacity can then be allocated in response to requests by a central master controller implemented by a common algorithm running in each terminal.

A DAMA system however introduces additional overhead into the multiple access channel due to the process of requesting and assigning capacity. In addition, the demand assignment process introduces a delay which can degrade the performance under the channel.

In some DAMA networks the total number of potential data terminals sharing the request channel is much larger than the number of terminals active at any given point in time. Thus, subdividing a DAMA request channel into smaller fixed allocation sub channels is impractical. It is thus necessary to design a request channel architecture based upon a random access technique which allows for the possibility of a small subset of active transmitters selected from a much larger set of potential transmitters. Two random access techniques are currently available for such applications which include ALOHA multiple access and CDMA.

The first data network to be based upon a random access protocol was ALOHANET which went into operation throughout the state of Hawaii in 1970. The ALOHA system was the first random access multi-point packet data communication system. The system uses a single radio channel shared by plurality of stations or data terminals. When a station generates a packet, the ALOHA system transmits the packet on the common radio channel. Since more than one station may attempt to transmit a packet at the same time several transmissions may overlap. The overlapping transmissions are said to collide if any portion of two transmissions overlap. When a collision occurs each station waits a random period of time before attempting to gain access to the channel again.

To increase the utilization of the radio channel, the slotted ALOHA system was proposed in which the channel is partitioned into time slots equal to a packet length wherein each station can only transmit a packet at the beginning of a slot. In this way overlapping transmissions are forced to completely overlap. Using a slotted approach almost doubles maximum channel utilization compared to the unslotted ALOHA system.

To reduce the effects of collisions in the slotted ALOHA system a slot reservation scheme was proposed. The channel was partitioned into frames each containing a reservation slot for transmitting a reservation packet and data slots for transmitting data packets. Each station transmits a reservation packet on a random access basis requesting slots needed for data packet transmission. If the request is granted data slots of a subsequent frame are assigned to the requesting station which subsequently transmits data packets on its assigned slots.

Satellite communications can provide point to point channels or broadcast and multiple access channels. A satellite is well suited to provide one to many i.e., broadcast, channels and many to one, i.e., multiple access, channels from and to an earth station. The architecture of the network used in very small aperture terminal (VSAT) data networks is almost always designed around a single large hub earth station transmitting data in a broadcast channel to a large number of VSATs as shown in FIG. 1. Considering Network A, for example, the VSATs 20 in such a network transmit data in packets to the hub station 18 using the multiple access capability of the satellite channel 17.

The communications from the hub station of a VSAT network to the VSATs themselves is easily configured using a conventional communication technique such as TDM or FDM. Currently, TDM is widely used for multiplexing the hub to the VSAT terminals, notwithstanding the fact that there are differences in data rate, modulation techniques and transmission formats among the various VSAT networks.

The multiple access link from the VSATs to the hub, however, is currently subjected to a greater degree of variation. The choice of multiple access technique from the VSATs to the hub is currently the primary feature distinguishing one network from another.

Recently, however, it has become commonplace to build VSAT networks composed of hundreds and thousands of more small VSAT terminals. The traffic in these networks is typically in the form of single data packets originating from interactive users or bursts of data packets originating from some type of file transcript protocol. As the number of stations in the network increases, the more the traffic from the single station will appear to fluctuate due to random user demand. In such networks, the use of FDMA or TDMA becomes impractical while the use of DAMA would impose an unreasonable amount of overhead in the network. Thus, to provide multiple access to these types of packet data networks, the access techniques of direct sequence (DS) spread spectrum multiple access, i.e., DS-CDMA and ALOHA, are used. Both these multiple access techniques however suffer from disadvantages. Direct sequence spread spectrum systems require the hub receiving station to have a digital matched filter operating at the high speed chip rate for each of the possible transmitters with each using a different spreading sequence. In a network with a large number of VSATs this becomes unwieldy and expensive to maintain. ALOHA systems suffer from relatively low capacity and high average power requirements.

SUMMARY OF THE INVENTION

The present invention is a reverse link for a satellite communication system. The reverse link described herein is suitable for use in any type of communications network such as networks used for Internet access purposes. The reverse link in combination with a forward link forms a complete two way communication system via satellite. The reverse link comprises two separate communication schemes used in combination to implement the reverse link of the satellite system. The first communication scheme uses a random access method based on a non synchronous frequency hopping code division multiple access technique (NS/FH/CDMA). The second communication scheme uses a channel assignment method based on a frequency division multiple access (FDMA) technique. Data generated by a user is transmitted utilizing one of the two communication schemes in accordance with the content and amount of data generated. Messages requiring a relatively low transmission rate, such as short bursty messages, utilize the random access transmission method. On the other hand, messages requiring a higher transmission rate, such as video conferencing, utilize the channel assignment method.

There is therefore provided in accordance with the present invention a multiple access communications system for use in a satellite communication network, comprising a plurality of user terminals for generating data to be transmitted over the multiple access communication system, at least one hub for receiving data over the multiple access communication system from the plurality of user terminals, transmitter means within each user terminal for receiving data to be transmitted from the user terminal to the hub, the transmitter means including first communication means for transmitting short bursty data in combination with second communication means for continuous transmission of data, switching means coupled to the transmitter means for switching transmission between the first communication means and the second communication means in accordance with predefined criteria and receiver means within the at least one hub adapted to receive data transmitted by the plurality of terminals utilizing either the first communication means or the second communication means.

The first communication means can comprise non synchronous multiple access communication means or non synchronous frequency hopping code division multiple access communication means. The second communication means can comprise frequency division multiple access communication means. The receiver means comprises means for receiving data transmitted by the plurality of user terminals using the first communication means, the first communication means utilizing non synchronous frequency hopping code division multiple access communications, means for receiving data transmitted by the plurality of user terminals using the second communication means, the second communication means utilizing frequency division multiple access communications and means for receiving preamble and synchronization message data transmitted by the plurality of user terminals precedent to transmissions utilizing the first communication means.

The switching means comprises means for switching transmission from the first communication means to the second communication means either in accordance with a source port field within messages received by the transmitter, when the length of a message received by the transmitter means exceeds a predetermined threshold, when a continuation flag in a message received by the transmitter means is turned on, when a user buffer containing a plurality of messages to be sent via the transmitter means fills beyond predetermined level or in accordance with the type and nature of the software application that initiated a message to be transmitted via the transmitter means.

The switching means comprises means for switching transmission from the second communication means to the first communication means either when a source port matching a predetermined criteria ceases to transmit messages, when the length of a message received by the transmitter means fails to exceed a predetermined threshold, when a continuation flag in a message received by the transmitter means is turned off, when a user buffer containing a plurality of messages to be sent via the transmitter means empties or when the software application meeting a predetermined criteria that initiated a message to be transmitted via the transmitter means ceases to generate message data.

In addition, the hub comprises collision detection means for determining when two frequency hops associated with two independent receivers are utilizing the same frequency at the same time, thus improving decoding within the receiver means.

There is also provided in accordance with the present invention a multiple access communication system for use in a satellite communication network, the satellite communication network including a plurality of user terminals and at least one hub, the system comprising first transmitter means for transmitting data utilizing a non synchronous frequency hopping code division multiple access communication scheme, second transmitter means for transmitting data utilizing a frequency division multiple access communication scheme, switching means for switching transmission between the first transmitter means and the second transmitter means in accordance with predefined criteria, first receiver means for receiving data transmitted using utilizing the non synchronous frequency hopping code division multiple access communication scheme, second receiver means for receiving data transmitted using the frequency division multiple access communication scheme and third receiver means for receiving preamble and synchronization data transmitted utilizing the utilizing a non synchronous frequency hopping code division multiple access communication scheme.

The switching means comprises means for switching transmission from the first transmitter means to the second transmitter means either in accordance with a source port field within messages received by the transmitter means, when the length of a message received by the transmitter means exceeds a predetermined threshold, when a continuation flag in a message received by the transmitter means is turned on, when a user buffer containing a plurality of messages to be sent via the transmitter means fills beyond predetermined level or in accordance with the type and nature of the software application that initiated a message to be transmitted via the transmitter means.

The switching means comprises means for switching transmission from the second transmitter means to the first transmitter means either when a source port matching a predetermined criteria ceases to transmit messages, when the length of a message received by the transmitter means fails to exceed a predetermined threshold, when a continuation flag in a message received by the transmitter means is turned off, when a user buffer containing a plurality of messages to be sent via the transmitter means empties or when the software application meeting a predetermined criteria that initiated a message to be transmitted via the transmitter means ceases to generate message data.

The system further comprises interface means for interfacing the at least one hub to an external communications network. The external communications network can comprise the Internet, a packet switched telephone network (PSTN), an Integrated Services Digital Network (ISDN), a Community Antenna Television (CATV) network, a Digital Subscriber Loop (xDSL) or a Frame Relay network.

The system further comprises collision detection means for determining when two frequency hops associated with two independent receivers within the receiver means are utilizing the same frequency at the same time, thus improving decoding within the first receiver means.

There is also provided in accordance with the present invention a multiple access communications system for use in a satellite communication network, comprising a plurality of user terminals for transmitting and receiving data over the multiple access communication system, at least one hub for transmitting and receiving data over the multiple access communication system to and from the plurality of user terminals, a forward communication link for transmitting data from the at least one hub to the plurality of user terminals, a return communication link for transmitting data from the plurality of user terminals to the at least one hub, the return communication link including a first communication means for transmitting short bursty data in combination with second communication means for continuous transmission of data, switching means within the plurality of user terminals for switching transmission between the first communication means and the second communication means in accordance with predefined criteria and receiver means within the at least one hub adapted to receive data transmitted by the plurality of terminals utilizing either the first communication means or the second communication means.

Further, each user terminal comprises means for generating a request to be sent over the return communications link in order to utilize the second communication means. The hub comprises means for polling each user terminal over the forward communication link as to whether the transmission of data should be switched to utilize the second communication means.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout
The following notation is used throughout this document.

| Term | Definition |
| --- | --- |
| CA | Channel Assignment |
| CATV | Community Antenna Television |
| CDMA | Code Division Multiple Access |
| DAMA | Demand Assigned Multiple Access |
| DPSK | Differential Phase Shift Keying |
| DQPSK | Differential Quadrature Phase Shift Keying |
| DSL | Digital Subscriber Loop |
| DTH | Direct-To-Home |
| DVB | Digital Video Broadcasting |
| FDM | Frequency Division Multiplexing |
| FDMA | Frequency Division Multiple Access |
| FH | Frequency Hoping |
| FSK | Frequency Shift Keying |
| IP | Internet Protocol |
| ISDN | Integrated Services Digital Network |
| ISP | Internet Service Provider |
| LAN | Local Area Network |
| NS | Non Synchronous |
| PLL | Phase Lock Loop |
| PSK | Phase Shift Keying |
| QPSK | Quadrature Phase Shift Keying |
| RA | Random Access |
| RC | Raised Cosine |
| SOHO | Small Office Home Office |
| TCP | Transmission Control Protocol |
| TDM | Time Division Multiplexing |
| TDMA | Time Division Multiple Access |
| UDP | User Datagram Protocol |
| VSAT | Very Small Aperture Terminal |
| WAN | Wide Area Network |

General Description

The present invention is a reverse link for a satellite communication system. The reverse link described herein is suitable for use in any type of communications network such as networks used for Internet access purposes. The reverse link in combination with a forward link forms a complete two way communication system via satellite. The forward link can comprise any well known communication scheme suitable for use as the forward link in a satellite communication system. In particular, the forward link may be constructed to comply with the European Telecommunication Standard (ETS) 300 421 put out by the European Telecommunications Standards Institute (ETSI) which describes the modulation and channel coding system for satellite digital television services. Systems based on the standard are intended to provide Direct-To-Home (DTH) services for consumer television systems and cable television head-end stations. In addition, the digital video broadcast (DVB) standard of transmission can also be used to construct the forward link.

Figure 1:
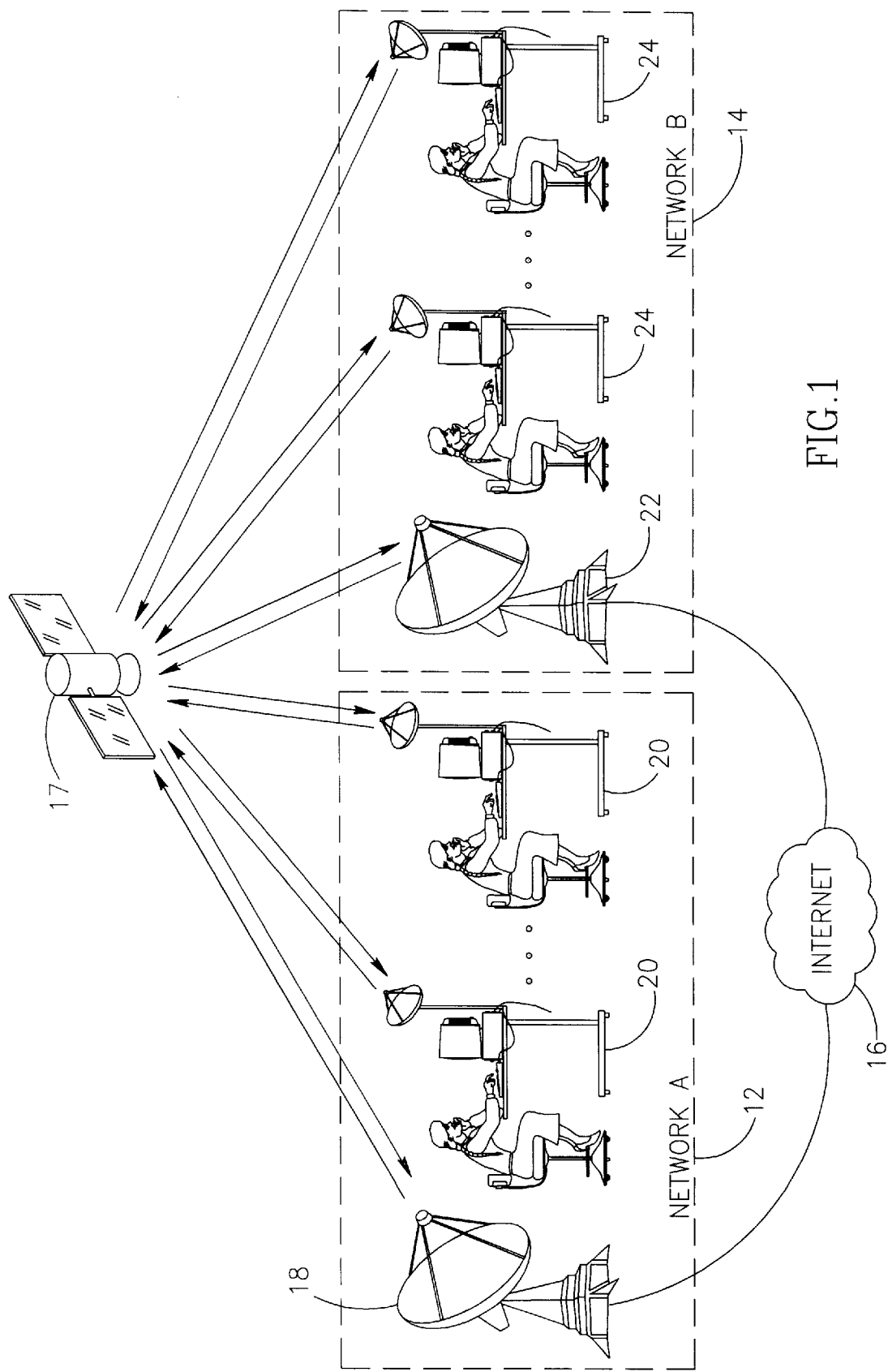
FIG. 1 is a high level block diagram illustrating two satellite communication networks coupled to the Internet utilizing both a forward and a reverse link via satellite.

Two satellite communication networks are shown in FIG. 1. In network A 12 a satellite 17 is used to forward communications between a hub 18 and a plurality of terminals comprising very small aperture terminal (VSAT) users 20, thus forming a forward link. In addition, a reverse link is established between the plurality of VSAT terminals 20 and hub 18 via satellite 17. Similarly, network B 14 comprises a hub 22 which communicates via a forward link to a plurality of VSAT terminals 24. The reverse link for the network B 14 is also via satellite between the plurality of VSAT terminals 24 and the hub 22. Hubs 18, 22 are coupled by terrestrial land based links to an external communications network 16 such as the Internet. Alternatively, the hubs 18, 22 can be connected to other types of land based networks. Alternative external communications networks include, but are not limited to, Frame Relay, Integrated Services Digital Network (ISDN), Community Antenna Television (CATV) and Digital Subscriber Loop (xDSL) such as Asynchronous DSL (ADSL) or Very High Speed DSL (VDSL).

The reverse link via satellite of the present invention provides an alternative solution to the existing prior art reverse links which utilize the telephone lines. The reverse link of the present invention is suitable for applications in outlying rural areas where ground based telephone lines have not been installed. In addition, access to the Internet can be provided for users including SOHO, business and others for interactive applications including video conferencing, LAN/WAN applications, document delivery, audio applications such as Internet phone, commercial web sites, Internet gaming, local ISPs and Internet meeting and collaboration software. A further advantage is that bottlenecks that occur in reverse link connections composed of regular telephone lines and local ISPs can be bypassed.

As mentioned previously, the reverse link of the present invention can be utilized with any well know forward link to form a two way satellite communication system. The forward link can comprise any commonly available conventional communication technology suitable for the forward link. Most of these technologies are based on time division multiplexing (TDM) communication techniques. The transmission from the hub in these cases is typically at a high data rate, i.e., 10 to 40 Mbps, and the data transmitted to the users is multiplexed in time. Each user utilizes the portion of the TDM signal that has been assigned to her/him. For example, the commercial satellite system known as DirecPC has a forward link of about 12 Mbps wherein each user receives approximately 400 Kbps of usable bandwidth. Most forward links in operation today typically utilize the digital video broadcast (DVB) standard of transmission.

The present invention discloses a novel scheme of multiple access for the reverse link of the two way satellite communication system. The reverse link accommodates various data rates in accordance with the transmitter power and the size of the antennae in addition to the type of information to be transmitted. The reverse link is utilized to transmit three different types of communication to the hub. Note that throughout this document the term 'message' is defined to mean a communication session between two points wherein the data is transmitted in the form of finite length units of data such as packets or frames. The term 'session' is also used in this document in its traditional sense to represent any communication sent from one point o another.

The first message type requires transmission rates lower than a certain number of bytes/sec. This message type comprises short messages such as requests to start a connection, requests to download data or requests to start long interactive sessions such as video conferencing and Internet phone applications. Also included in the first type of message is data derived from web browsers which typically have low duty cycle bursty type messages on one leg and acknowledge messages on the other. This first type of message typically requires immediate access to the channel. In other words, the delays due to coordination and channel assignment should be avoided for information of this type.

The second message type requires transmission rates higher than a certain number of bytes/sec. This message type comprises messages that typically include large files of information. The data rates for these type of messages is typically relatively high.

The third message type include messages that are known to require a continuous type communications channel. This message type comprises messages generated from two way bandwidth intensive applications such as video conferencing, Internet phone, etc.

The present invention discloses a reverse link which utilizes two multiple access schemes working in cooperation with each other. For short messages of the first type of information a non synchronized multiple access scheme is utilized. A frequency hopping spread spectrum scheme is utilized due to its ease of implementation and the absence of the need for power control. Thus, short messages are transmitted using non synchronous frequency hopping code division multiple access (NS/FH/CDMA). For the continuous transmission of data, a channel is allocated using frequency division multiple access (FDMA). The communication scheme utilizing FDMA offers continuous transmission, relatively high capacity and ease of implementation. A block of spectrum dedicated to the entire reverse length for both multiple access schemes is divided into two sub bands. One sub band is for the NS/FH/CDMA sub band, also known as the random access (RA) sub band, and the other sub band is dedicated for the FDMA sub band otherwise known as the channel assignment (CA) sub band. In one example embodiment, 4 MHz is assigned to the random access sub band and 6 MHz is assigned to the channel assignment sub band for a total of a 10 MHz bandwidth.

The communication system of the present invention has two modes of operation: random access (RA) and a channel assignment (CA) mode. Communications always start in the random access mode using the random access frequency sub band in such a way that the user is able to start communications at any point in time. After communications have begun, the system decides whether to continue in random access mode such as when the user is browsing, for example, or whether to assign a channel with optimal bandwidth in accordance with the users application, e.g., video conferencing or Internet phone applications. In such a case, the user will use the channel assignment mode using the channel assignment frequency sub band. After the user finishes to work in the channel assignment sub band, e.g., the user has closed the video conferencing application, the allocation of the channel is terminated and the user continues communicating via the random access channel as required.

The user transmits messages using any suitable protocol such as the TCP/IP protocol format. For illustrative purposes, the transmitter method is presented using the TCP protocol as an example. Note, however, that the method is suitable to be used with other protocols as well. The transmitter method makes decisions about the mode of operation in accordance with the following procedure. Communications begins in the random access mode by transmitting the TCP messages in the random access frequency sub band. The decision to switch to the channel assignment mode is made in accordance with one of the following criteria:

1. If the source port in the TCP/IP protocol header corresponds to a predetermined list, the system will request a switch to the channel assignment mode. The list includes source ports of application such as video conferencing, file transfer, Internet phone, etc.
2. If the length of the TCP/IP message is larger than a specified length the system will request a switch to the channel assignment mode. Note that TCP/IP messages have a maximum length. For a line modem this maximum is approximately 2 KB.

3. If a continuation flag is set. This occurs when the application sends a message having a length longer than the maximum length of a TCP/IP message. In this case, the message is divided into several TCP/IP messages wherein a flag field in the message is turned on indicating that additional TCP/IP messages follow. If this flag is turned on, the system will request a switch to the channel assignment mode.

4. It the user buffer is full of messages waiting to be sent, the system will request a switch to the channel assignment mode.

In accordance with these above criteria a request is made to allocate a CA channel by sending a Request For Allocation message. The request also includes a specific requested data rate. The controller in the hub will then allocate a CA channel with a center frequency parameter in accordance with availability and at a data rate according to the request. The end user will be notified via the forward link of the assignment of the CA channel. Once allocated, the user transmits messages using the CA mode of communications.

The decision to switch back to the random access mode is made basically when the transmission from the source port ends. The message is sent via the CA channel to request a switch back to the random access mode in accordance with the following criteria:

1. If the TCP/IP protocol source port corresponding to a source port in the given list is not transmitting any messages any longer, the system will request a switch back to the RA mode.
2. If the long messages have terminated, the system will request a switch back to the RA mode.
3. If the user output buffer becomes empty, the system will request a switch back to the RA mode.
4. If messages from the specific application cease to be generated, the system will request a switch back to the RA mode.

If any of the above listed events occur, the controller in the hub will cease allocation of the CA channel and notify the user. Once notified, the user switches back to the RA mode of communications.

Random Access (RA) Mode

The random access mode using NS/FH/CDMA will be now be described in more detail. The purpose of the random access NS/FH/CDMA communication scheme is to permit random access communications in the reverse link for sending short messages. The main characteristics of the random access scheme for the reverse link are random access, no feedback (feedforward), frequency hopping, error correction coding and lack of time synchronization requirements among users.

In a frequency hopping CDMA system, the instantaneous frequency bandwidth is relatively narrow. However the center frequency is changed during every time interval termed a time hop. The frequency hopping communication system comprises transmitters wherein the data is modulated and up converted with a frequency hopping local oscillator. The receiver down converts the received signal with a frequency hopping local oscillator synchronized to the transmitter such that at any instant of time the local oscillator which up converts the modulated signal in the transmitter uses the same frequency as the local oscillator which down converts the received signal in the receiver. Therefore, for proper operation of the frequency hopping transmitter receiver pair both the transmitter and the receiver must be synchronized with each other. A frequency hopping transmission system for satellite networks is described in detail in "Frequency-hop Transmission For Satellite Packet Switching and Terrestrial Packet Radio Networks," M. B. Pursley, IEEE Journal on Selected Areas in Communications, Vol. 8, No. 4, May 1990.

Figure 2:
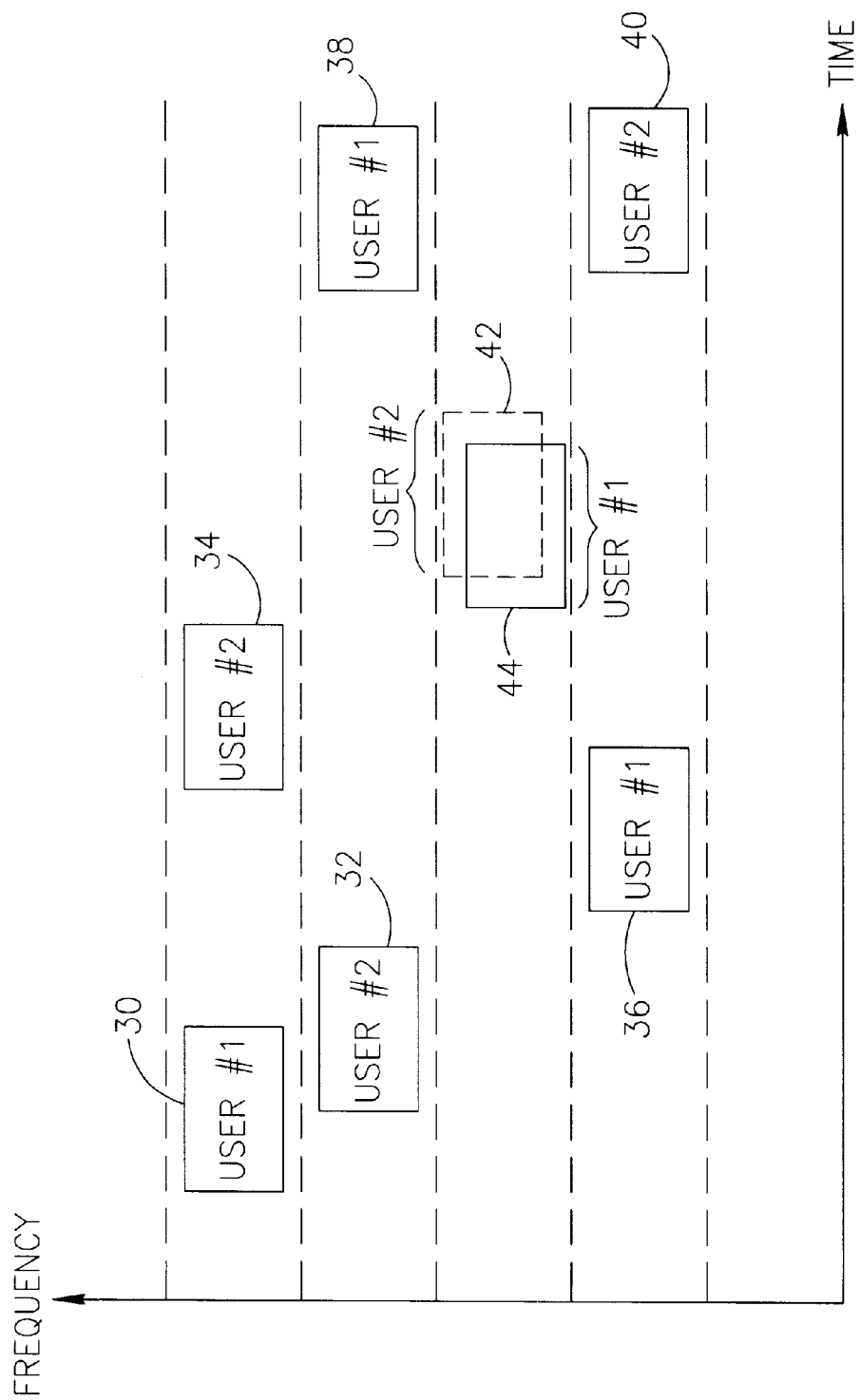
FIG. 2 is a graph illustrating the relationship between time and frequency for data packets transmitted by two users.

In a non synchronized frequency hopping CDMA communication system there is no time synchronization among the plurality of users and thus mutual interference among users exists. Thus, in this type of a system there may be more than one user transmitting at the same time which results in a collision. This is illustrated in a diagram showing the relationship between frequency and time among the transmissions of two users as shown in FIG. 2. Each of the horizontal bands in the diagram of FIG. 2 represents a frequency band in a random access sub band. With reference to FIG. 2, each user transmits messages which are broken up into groups of symbols (packets) as represented by each of the boxes in the Figure. User #1 transmits a group of symbols comprising a sub packet 30 at the same time user #2 transmits another sub packet 32. The two groups of transmissions do not interfere with each other since they take place on different frequencies. User #1 continues to transmit sub packets as shown in boxes 36, 44, 38. Likewise, user #2 transmits sub packets as represented by boxes 34, 42, 40. FIG. 2 shows the frequency hopping nature of the random access mode wherein sequential sub packets are transmitted using different frequencies. However, since the random access mode is not synchronized, collisions on a particular frequency can occur. This is shown in FIG. 2 by transmissions 44 from user #1 and 42 from user #2. Transmissions from both users #1 and #2 overlap at some point thus causing a collision and making it impossible for the receiver to receive either of the two sub packets.

Note that typical prior art frequency hopping communication systems are orthogonal in nature. This means that at any particular point in time there is no overlap of the frequencies used by any of the users. In addition, synchronized frequency hopping communication systems are characterized by each user switching or hopping frequencies at the same time. In a system where all the hops are synchronized with each other it makes sense for the system to be orthogonal also. However, in systems such as the present communication system, if non synchronous hopping is utilized it does not make sense to implement orthogonal frequency hopping.

The following system parameters are utilized by the RA frequency hopping CDMA communication scheme:

1. $B_T$: bandwidth of the entire RA sub band
2. $R_B$: raw bit rate of each channel input
3. $R_C$: error correcting code ration
4. $R_S$: symbol rate
5. r: RC spectrum roll off factor
6. $B_f$: instantaneous bandwidth for one channel
7. $N_F$: number of frequencies
8. N: number of users
9. $N_{BPM}$: number of bits per message (variable length message)

Preferably, the modulation scheme used for the RA mode is differential QPSK (DQPSK) or D$\pi$/4QPSK. These modulation schemes are more robust in an environment with mutual interference since only the difference between two symbols needs to be determined. Soft decisions may be obtained in the receiver utilizing a modified version of the Viterbi ratio threshold method, which is well known in the art. Coherent demodulation is not recommended in such a system as it is not practical for use in a jamming environment. The RA mode can utilize a number of well known error correction codes (ECC), such as convolutional codes or Reed-Solomon codes. More detail on the use of Reed-Solomon codes in frequency hopped networks can be found in "S. W. Kim and W. Stark, "Optimum Rate Reed-Solomon Codes for Frequency Hopped Spread Spectrum Multiple Access Communication Systems," IEEE Transactions on Communications, Vol. COM-37, February 1989.

Each user in the communication system is hopping on a map of $N_F$ frequencies in a total bandwidth $B_T$ with an instantaneous bandwidth $B_I$ such that $$B_T = N_F \times B_I$$

A sequence of length $N_{SEQ}$ hops is used to transmit the message. The sequence consists of $N_{SYNCH}$ synchronization hops and $N_{DATA}$ data hops where $$N_{SEQ} = N_{SYNCH} + N_{DATA}$$

Figure 3:
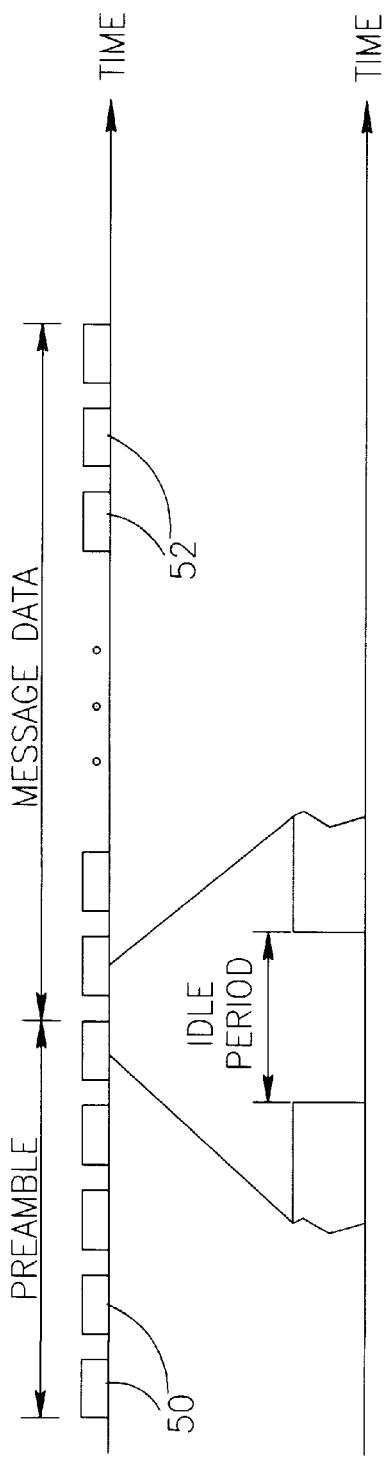
FIG. 3 is a diagram illustrating sequence of packets transmitted in time making up a message.

All the sequential hops including both the synchronization hops and data hops use the same map of $N_F$ frequencies. Each hop has a duration of $T_{HOP}$ and the guard time interval between hops is $T_{GUARD}$. The timing diagram showing the message as a function of time is shown in FIG. 3. In each hop there are $N_{SPH}$ symbols per hop plus a reference symbol. The constant length message of $N_{BPM}$ bits requires $N_{DATA}$ data hops as expressed below.

$$N_{DATA} = \frac{N_{BPM}}{2 \cdot R_C \cdot N_{SPH}}$$

Where the duration of the transmission is given by the expression $$N_{SEQ}(T_{HOP} + T_{GUARD})$$

With reference to FIG. 3, the complete message is made up of a preamble and a message data portion. The preamble comprises a fixed number of hops denoted by reference numeral 50. For example, the preamble can comprise five hops. The data portion of the message comprises a plurality of hops, wherein a sub packet (denoted by numeral 52) is transmitted during each hop. The frequencies of the hops in the preamble is actually a subset of $N_F$. For example, if there are $N_F$=30 frequency hops on the map of $N_F$ frequencies, the preamble utilizes a subset of these frequencies, e.g., 10 frequencies. For each preamble sent, 5 of these 10 frequencies are then chosen to comprise the preamble portion of the message. The preamble contains information comprising an ID, the hop code, hop sequence, time when to start reception of the data portion of the message and the particular hop number within the preamble/synchronization set of hops, i.e., a number within the range 1 through 5. Shown in FIG. 3 is an enlargement of the idle period between hops. In most prior art frequency hopping communication systems this gap or idle period is minimized in order to be more efficient. The present invention, however, includes a relatively large idle period which functions to reduce the hardware and software requirements of the transmitter and the receiver for synchronization purposes. However, the time transmission of the message is lengthened somewhat but the probability of collision between users is not affected at all.

The frequency hopping sequences are constructed as follows. The frequencies of the preamble/synchronization hops are randomly chosen out of a subset of 10 selected frequencies (continuing the example presented above). The frequencies of the data hops for the message data are chosen according to 1 out of 128 selected predefined frequency hopping sequences. Each sequence being represented by a particular byte number. The sequence may be randomly chosen by the user, however, the receiver should receive the ID number of the chosen sequence in the synchronization data included in the preamble or synchronization hop.

As described previously, there are two formats for the transmitted hop, one format is for the synchronization hop or preamble hop and one is for the data hop. The synchronization hop comprises a known fixed sequence utilized for acquisition purposes and having a length of approximately 16 to 64 symbols. The synchronization hop also comprises control data such as synchronization data including the data representing the frequency hopping sequence number and the starting time of the data frequency hopping sequence. The data hops comprise a short known fixed sequence for tracking purposes having a length of up to 16 symbols and also comprising the encoded data. In one embodiment, the fixed data may comprise only one symbol used as a reference for a differential detection in the receiver.

Channel Assignment (CA) Mode

Figure 4:
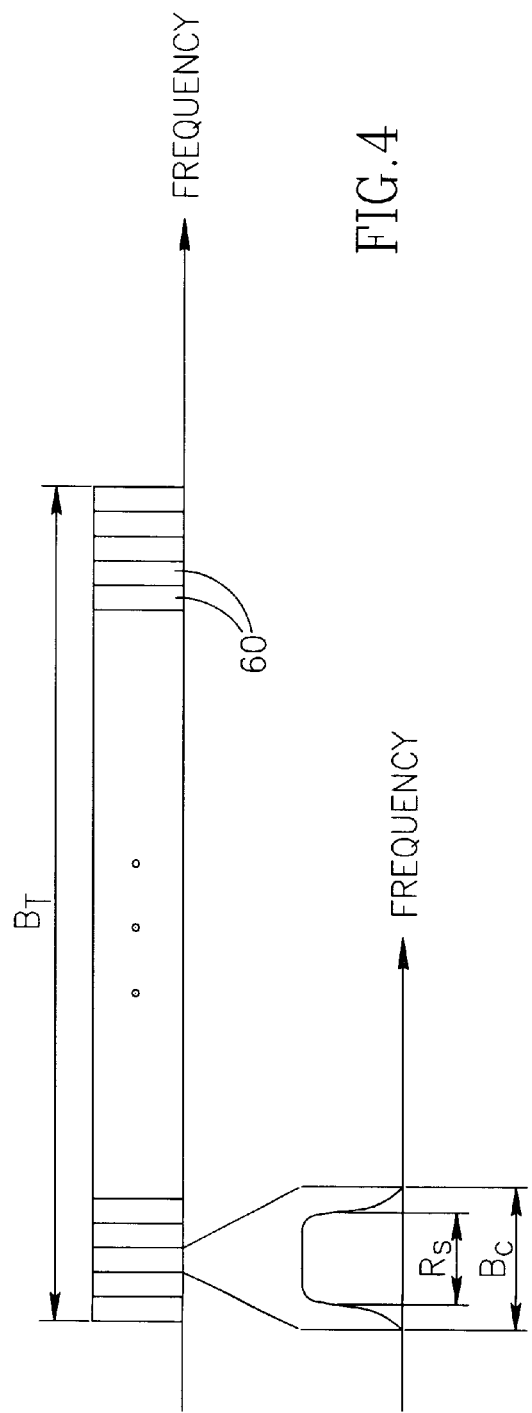
FIG. 4 is a diagram illustrating a frequency band making up the frequency spectrum of the communication system.

The channel assignment mode using FDMA will now be described in more detail. Note that the following notation is also applicable to the RA mode discussed above. In general, FDMA techniques are suitable only for a communication system which allocates frequencies and bandwidth such that no more than one user will utilize the same frequency band at the same time. A diagram illustrating the frequency band of the FDMA portion of the present invention is shown in FIG. 4. If all users transmit within total average data rate R, in a total bandwidth $B_T$, with a modulation encoding scheme having an efficiency of 1 bps/Hz, the maximum number of users is defined by N where $$N = \frac{B_T}{R}$$

In FIG. 4, the frequency band $B_T$ MHz is shown and $$\frac{B_T}{R}$$

frequency channels 60 are indicated. One of the frequency channels 60 is shown enlarged and the spectrum of the transmitted signal is shown to occupy a bandwidth denoted $B_C$.

In the FDMA system of the present invention, the frequencies must be allocated to each user utilizing a control means. In an FDMA system, not all the users are required to use the same amount of bandwidth. A system with flexible bandwidth allocation adapted to the needs of the user and assigned on demand is called a bandwidth on demand (BOD) system. In such a system, the transmission is continuous with the transmission parameters such as coding rate and data rate is adapted to each user. The data transmission can utilize a quadrature PSK (QPSK) modulation scheme with data rates of 32 Kbps, 48 Kbps, 64 Kbps, 96 Kbps, 128 Kbps, 192 Kbps, 256 Kbps or 384 Kbps. In addition, an ECC such as a convolutional code having a rate such as 1/2 or 3/4 can be used with symbol rates of 32 Kbps, 64 Kbps, 128 Kbps or 256 Kbps. Better efficiency from the power amplifier and the transmitter can be obtained by utilizing π/4QPSK or OQPSK modulation rather than QPSK modulation. The symbol rate within a frequency slot 60 is shown represented by $R_S$ with $B_C - R_S$ used as a guard band between

Reverse Link Transmitter

The transmitter portion of the reverse link of the present invention will now be described in more detail. The transmitter for the reverse link actually comprises two portions: a random access portion and a channel assignment portion. Although the two portions are shown separately, overlapping functions can be combined. In general, the transmitter comprises a user interface and a message classifier. The data received from the user is divided or classified into three different types of messages, as described previously.

The first message type requires transmission rates lower than a certain number of bytes/sec, i.e., short messages. The second message type requires transmission rates higher than a certain number of bytes/sec. The third message type include messages that are known to require a continuous type communications channel. This third message type comprises messages generated from two way bandwidth intensive applications such as video conferencing, Internet phone, etc.

Each type is processed in the transmitter in a different way. The random access (RA) transmitter is utilized for short messages wherein each message is transmitted as a packet, a packet being the information transmitted in a single hop. The channel assignment (CA) transmitter is utilized for long streams of information, i.e., message types two and three. A specific frequency and a particular bandwidth are assigned and the data is transmitted for a specific period of time or until the data ends.

The processing performed by the transmitter includes formatting of the transmission signal and encoding of the user data using an error correction code. In the random access mode, the synchronization sequence precedes the encoded data message. The combined stream of data is divided into smaller bursts wherein each burst is transmitted at a specific time and frequency. This method can be classified as a CDMA type of multiple access scheme since many users are transmitting simultaneously in the same frequency band but using different sequences of frequencies and timing for the transmission bursts.

In the channel assignment mode, the user data is transmitted continuously in contrast with the bursty transmissions in the random access mode. In the random access mode, the frequency used for a transmission is changed at every burst to a predefined frequency within a frequency band dedicated for this mode. In the channel assignment mode, the frequency is fixed during the transmission within a frequency band dedicated for this mode.

Figure 5:
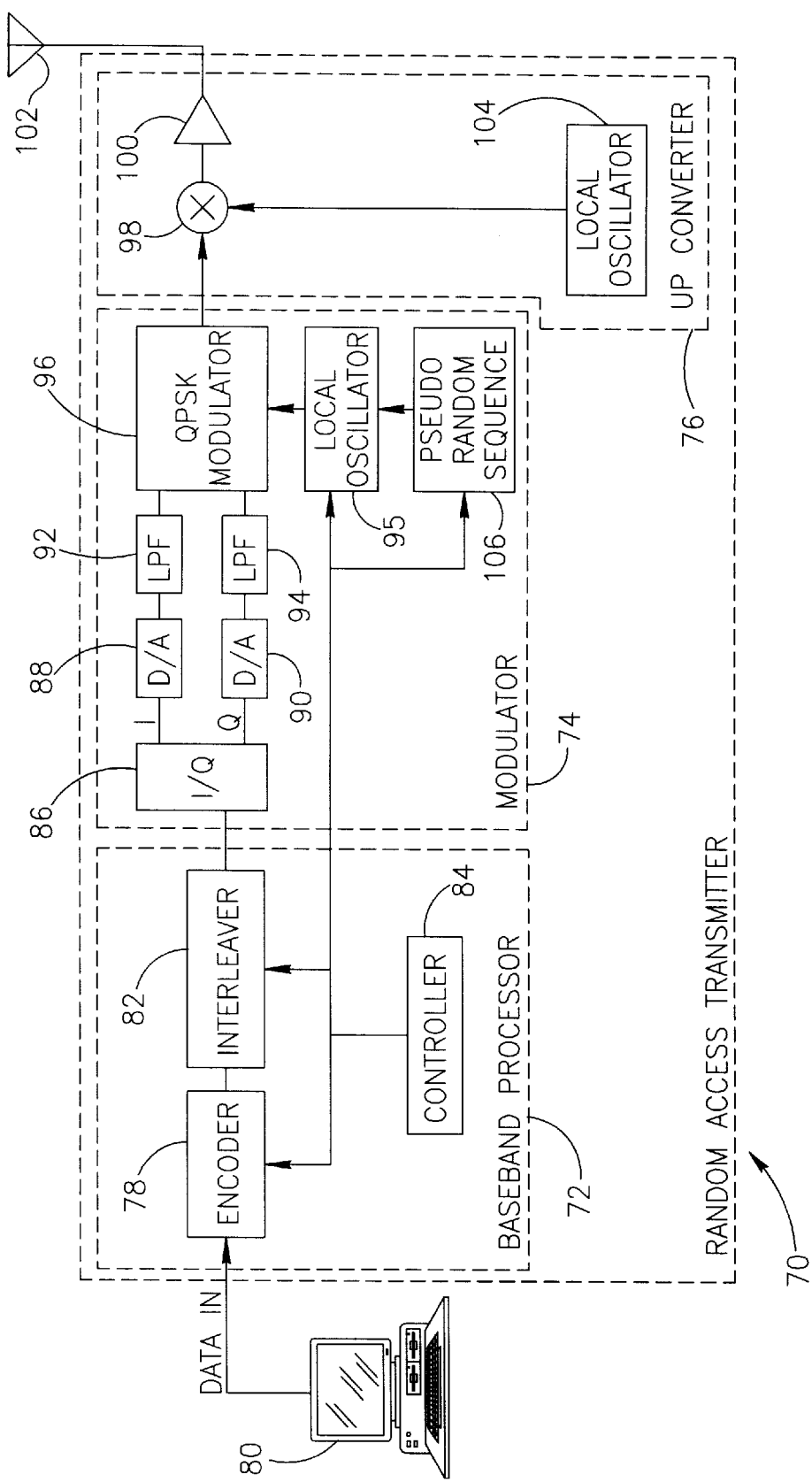
FIG. 5 is a high level block diagram illustrating the random access transmitter of the communication system of the present invention.

The random access (RA) transmitter portion of the present invention will now described in more detail. A high level block diagram illustrating the random access transmitter of the communication system of the present invention is shown in FIG. 5. Data generated by a user 80 is input to a baseband processor 72 which comprises an encoder 78, interleaver 82 and a controller 84. The baseband processor may comprise the 56002 Digital Signal Processor (DSP) manufactured by Motorola, Inc. The encoder 78 functions to apply a correction code such as a convolutional code, a Reed-Solomon code or both to the data input from the user 80. Once encoded, the data combined with the code bits are interleaved using interleaver 82. The output of the interleaver is input to a modulator of 74 which comprises an I/Q generator 86 which functions to generate an I and Q data stream. The I data stream is input to a D/A converter 88 and then filtered via low pass filter to 92.

Similarly, the Q data stream is input to D/A converter 90 and filtered via low pass filter 94. The I and Q data streams output by low pass filters 92, 94 respectively, are input to QPSK modulator 96. A local oscillator 95 generates a local reference signal for the QPSK modulator 96. The local oscillator 95 receives a hopping sequence from the pseudo random sequence generator 106. The local oscillator 95 may comprise a digital data synthesizer (DDS) driven PLL as described in the Qualcomm Synthesizer Product Databook, November 1996, or the clean single PLL model VDS-6000 manufactured by SCITEC, San Diego, Calif. The controller maintains control of the local oscillator 95 and the pseudo random sequence generator 106. The frequency hopping of the random access transmitter 70 is controlled via control signals output by the pseudo random sequence generator 106 and input to the local oscillator 95. The output of the QPSK modulator 96 is then input to the upconverter 76 which functions to shift the modulated signal to a frequency suitable for a transmission via the satellite 17 (FIG. 1). The I/Q generator 86 performs differential encoding of pairs of binary bits before the data stream is split into separate I and Q channels. The QPSK modulator may comprise the STEL 9231 manufactured by Stanford Telecom, Sunnyvale, Calif. or the direct conversion I/Q modulator IC, model RF2422, manufactured by RF Micro Devices, North Carolina.

The upconverter 76 comprises a mixer (multiplier) 98, local oscillator 104 and power amplifier 100. The upconverter may comprise the Ku-band transceiver for satellite communications, model 3100 Series, manufactured by SierraCom, Massachusetts. The output of the QPSK modulator 96 is mixed with the output of the local oscillator 104 via mixer 98. The output of the mixer is then amplified by a power amplifier 100 whose output is directed to the antenna 102. Controller 84 functions to control the operations of the encoder 78, interleaver 82, QPSK modulator 96, local oscillator 95 and the pseudo random sequence generator 106.

Figure 6:
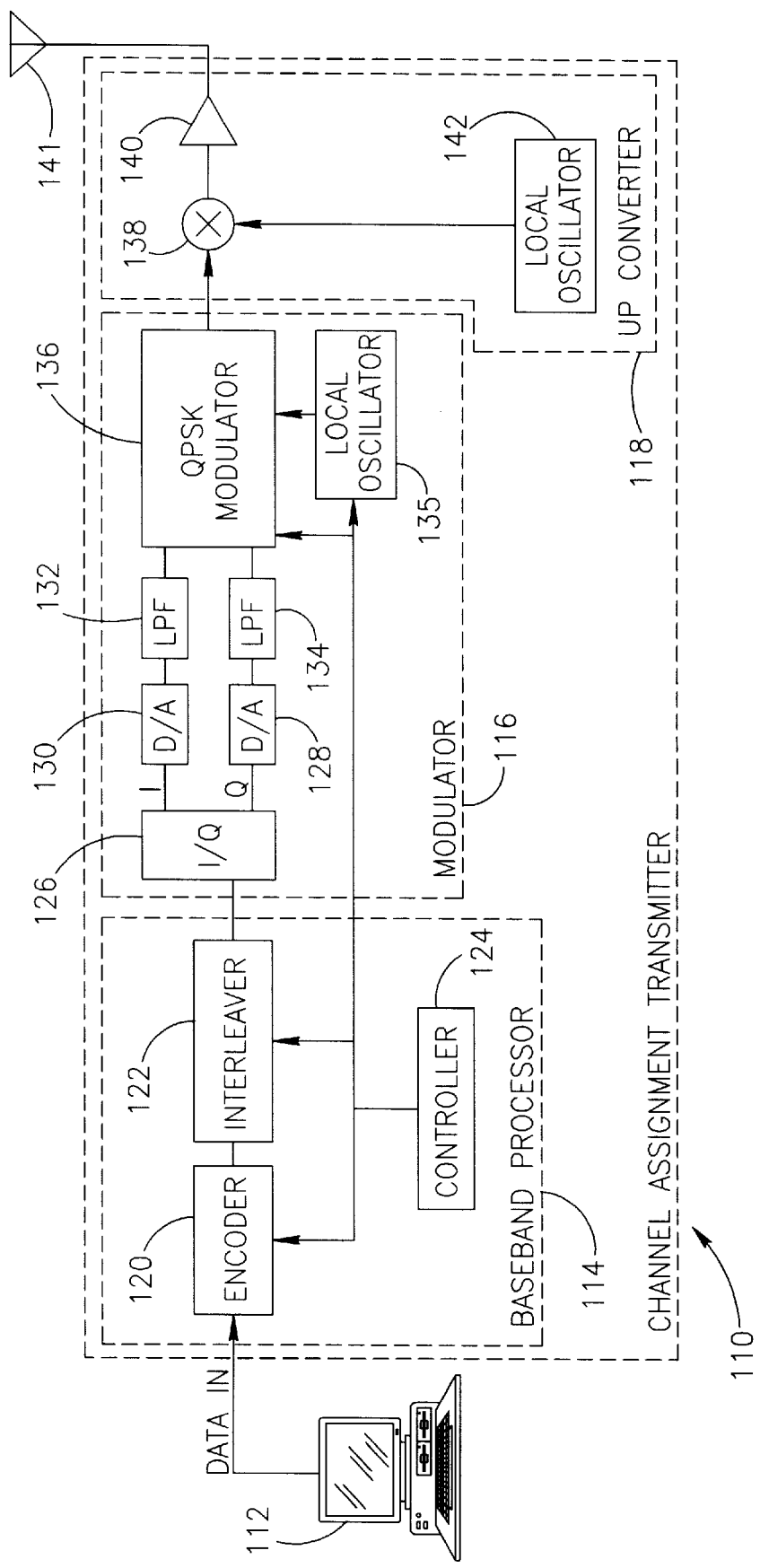
FIG. 6 is a high level block diagram illustrating the channel assignment transmitter of the communication system.

A high level block diagram of the channel assignment (CA) transmitter is shown in FIG. 6. The channel assignment transmitter, generally referenced 110, comprises a baseband processor 114, a modulator 116 and an upconverter 118. In operation, data generated by user 112 is input to the baseband processor 114 which comprises an encoder 120, an interleaver 122 and a controller 124. The baseband processor may comprise the 56002 Digital Signal Processor (DSP) manufactured by Motorola, Inc. The input data is encoded using an error correction code and is subsequently interleaved before being input to the modulator 116. The modulator 116 comprises an I/Q generator 126 which functions to generate the I and Q data streams. The I data stream is input to D/A converter 130 and then filtered via low pass filter 132.

Similarly, the Q data stream is input to D/A converter 128 and subsequently filtered via low pass filter 134. Both D/A converters may comprise the AD 7943 manufactured by Analog Devices, Norwood, Mass. Both the I and Q data outputs of the low pass filters 132 and 134, respectively, are input to the QPSK modulator 136. The QPSK modulator functions to modulate the I and Q inputs using a QPSK modulation technique. A local oscillator 135 provides a local reference signal to the QPSK modulator 136. The QPSK modulator may comprise the STEL 9231 manufactured by Stanford Telecom, Sunnyvale, Calif. or the direct conversion I/Q modulator IC, model RF2422, manufactured by RF Micro Devices, North Carolina. The local oscillator 135 may comprise the clean single PLL model VDS-6000 manufactured by SCITEC, San Diego, Calif.

The output of the modulator 136 is input to the upconverter 118 which comprises a mixer 138, power amplifier 140 and a local oscillator 142. The upconverter may comprise the Ku-band transceiver for satellite communication, model 3100 Series, manufactured by SierraCom, Massachusetts.

The output of the modulator is mixed with the local oscillator signal via mixer 138. The output of the mixer 138 is then amplified via power amplifier 140 and input to the antenna 141 for transmission via the satellite 17 to the hub. The controller 124 functions to control the operations of the channel assignment transmitter and in particular, the encoder 120, interleaver 122, QPSK modulator 136 and the local oscillator 135.

It is noted that the construction of the RA and the CA receivers are very similar to each other. Most of the hardware, in fact, can be shared and two modes of operation provided with only minor changes needed to implement each mode.

Figure 7:
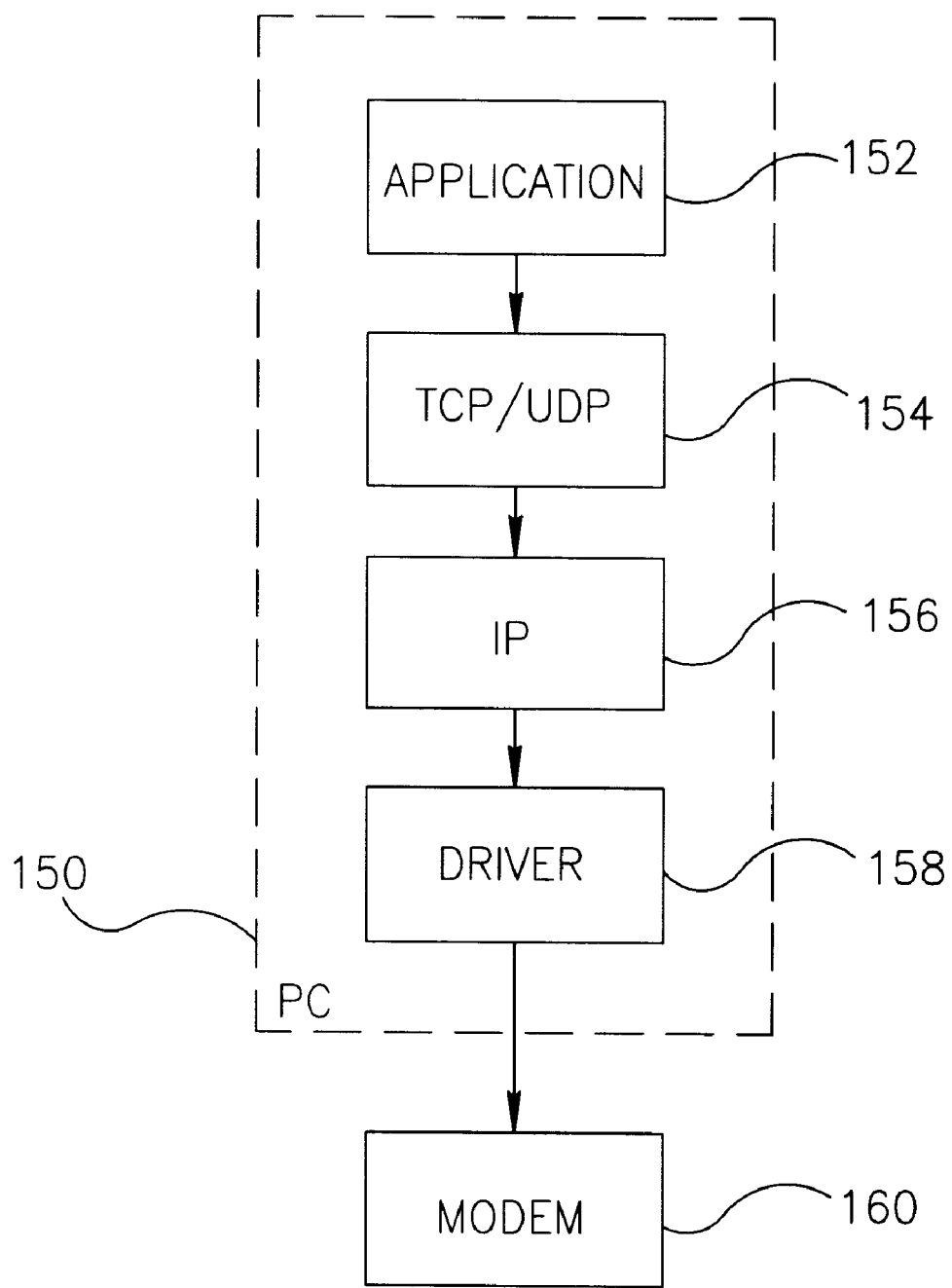
FIG. 7 is a high level block diagram illustrating the software layers making up the personal computer based transmitter method portion of the communication system.

The transmitter method of the present invention will now be described in more detail. A high level block diagram illustrating the PC based transmission method of the present invention is shown in FIG. 7. The method of the transmitter operates in a sequence of layers with the top layer being the application layer 152. In addition to the application layer the other layers used include TCP/UDP layer 154, IP layer 156 and a driver layer 158. The PC 150 transmits data to be sent via satellite to the hub to the modem 160 which comprises the random access transmitter 70 (FIG. 5) and the channel assignment transmitter 110 (FIG. 6).

The transmitter method portion of the present invention is situated within the driver layer 158. The transmitter method operates as a driver under the IP layer receiving IP packets output therefrom. Each protocol utilized by the application is identified by its own so called well known port number. The well known port number is part of the TCP/UDP header embedded within the IP packet. Each packet is identified by its connection including its source and destination addresses and source and destination ports. In the random access mode, the transmitter method monitors the port number and the rate of the packets being received as measured in bits per second (bps). The bps rate is monitored by counting the number of bytes transmitted within a specific time window. If one of the applications transmits packets whose source port within the protocol header corresponds to a predetermined list or the length of the messages is larger than a specified length, the driver requests a channel assignment. In addition, if the rate of the transmission is higher than the maximal rate permitted in the random access mode the driver also requests a channel assignment. Note that the application layer 152 can be implemented using, for example, any browser or web browser, e-mail application or other communication type application.

Figure 8:
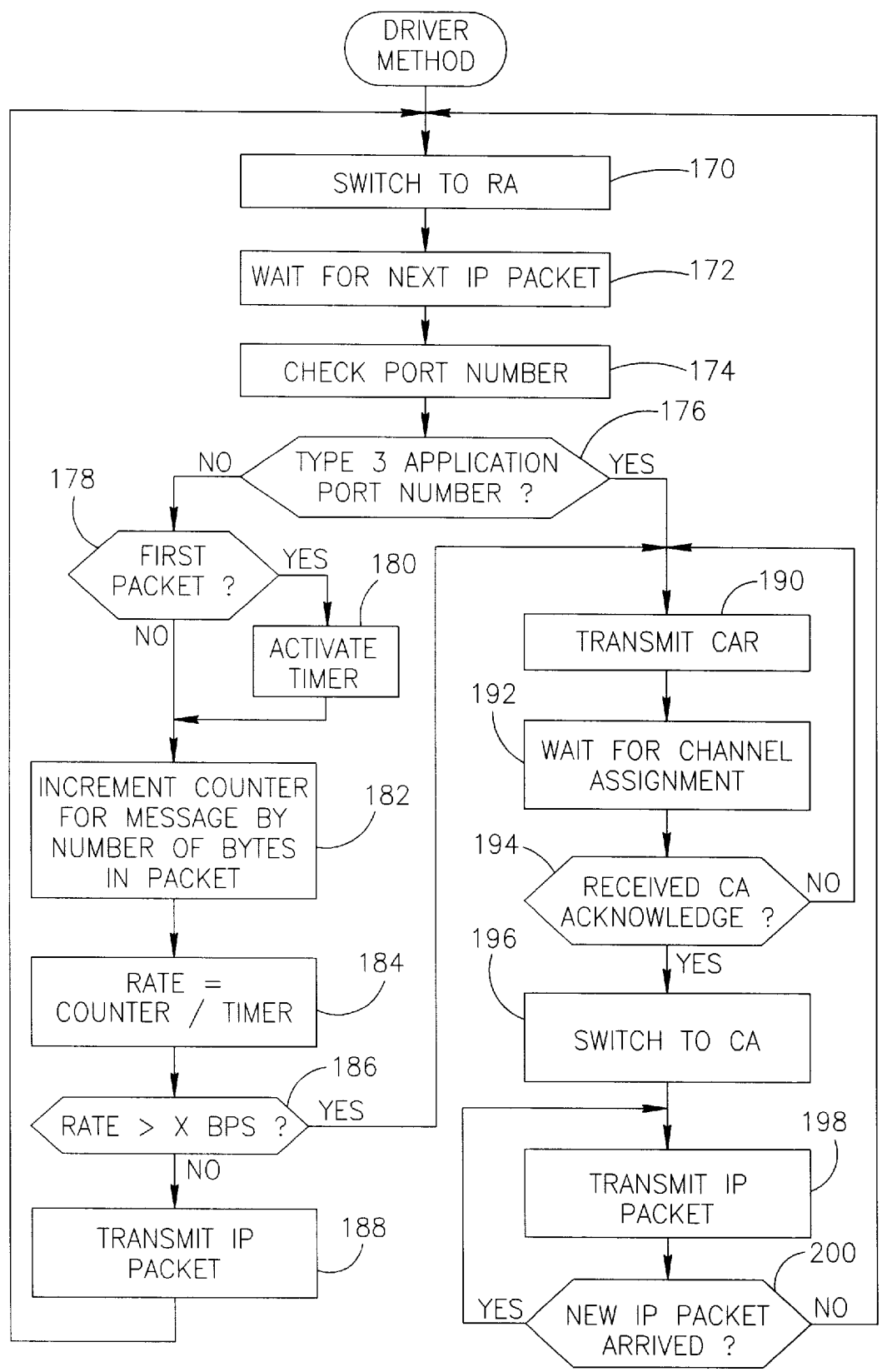
FIG. 8 is a high level flow diagram illustrating the driver method of the present invention.

A high level flow diagram illustrating the driver method of the present invention is shown in FIG. 8. Initially, the transmission mode within the modem 160 is switched to the random access mode (step 170). The modem then waits for the next IP packet to arrive (step 172). Once the next IP packet has arrived the port number contained therein is checked (step 174). If the port number is associated with a type 3 application (step 176) then a channel assignment request (CAR) is then transmitted (step 190). Examples of well known port numbers for type 3 applications include:

1651: Audio Conferencing
1652: Video Conferencing

These port numbers are valid for both TCP and UDP protocols.

The modem then waits for the channel assignment to be performed (step 192). Note that the channel assignment request is transmitted using the random access mode of communications. Once the channel assignment request acknowledgment is received (step 194), the modem switches to channel assignment mode of communications (step 196). If no channel assignment request acknowledgment is received then the channel assignment request is transmitted again in a second attempt.

Once the modem switches to channel assignment mode, the IP packet is then transmitted using FDMA (step 198). The modem then waits for the next IP packet to arrive (step 200). Once the next IP packet arrives it is transmitted (step 198). In this fashion IP packets arrive and are transmitted using the channel assignment mode. When no IP packet arrives after a predetermined time out period the modem switches back to random access mode (step 170).

If the application port number determined in step 176 is not associated with a type 3 application then it is then determined whether the packet of data received is the first packet in a message (step 178). If the packet received is a first packet of a message then a timer is then activated (step 180). A counter associated with the message is then incremented by the number of bytes contained in the packet (step 182). The rate of transmission is then calculated by dividing the counter value by the timer value (step 184). If the rate is greater than a certain threshold (step 186) then the modem switches to channel assignment mode and a CAR is subsequently transmitted (step 190). If the rate is less than or equal to the predetermined threshold then the IP packet is transmitted using the random access mode (step 188). Control then returns to the beginning of the method and the modem waits for the next IP packet to arrive (step 172).

Figure 9:
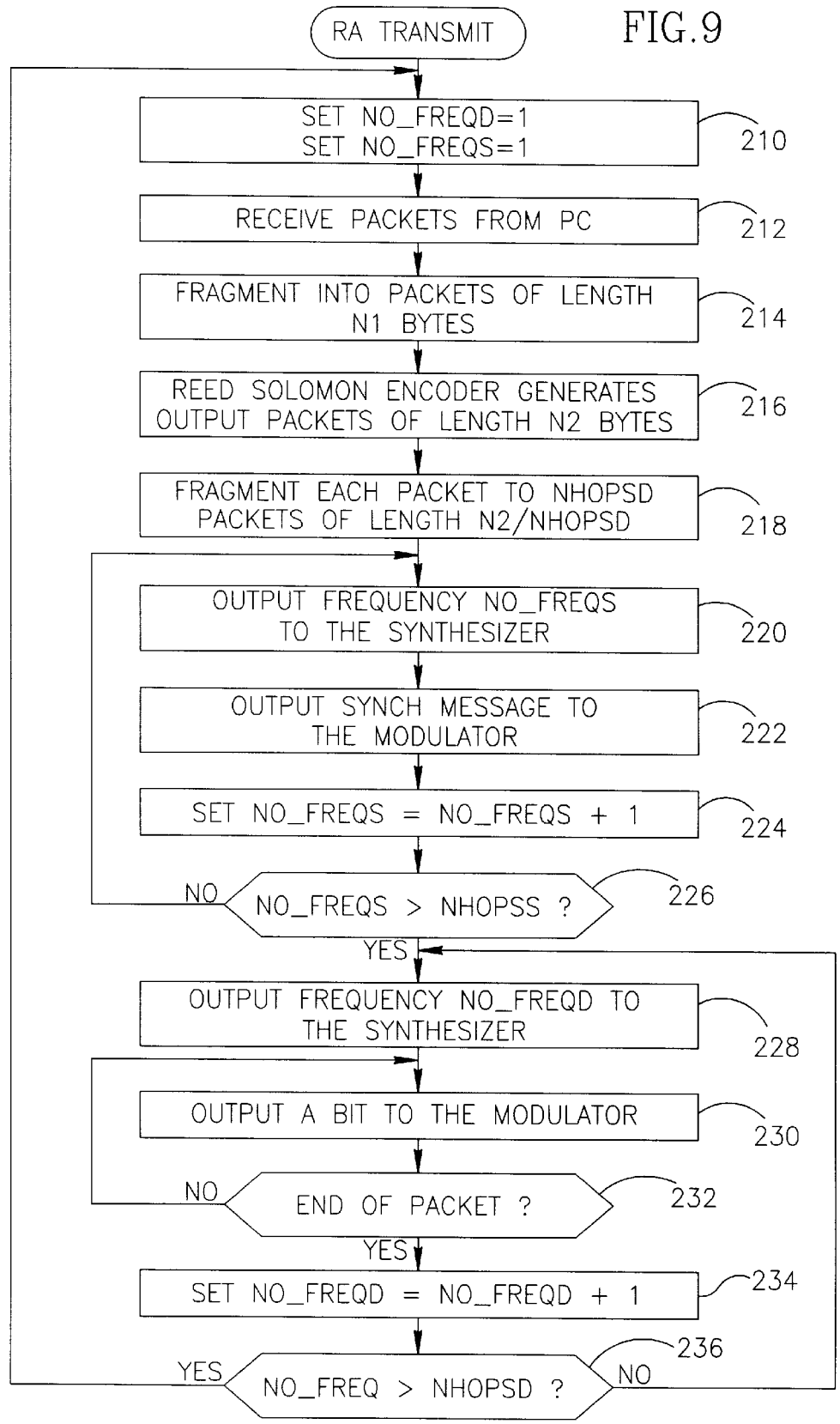
FIG. 9 is a high level block diagram illustrating the random access transmitting method of the present invention.

The operation of the frequency hopping or random access transmitter will now be described in more detail. A high level flow diagram illustrating the random access transmitter method of the present invention is shown in FIG. 9. In general, the basic steps of the random access transmission method comprise receiving a new data packet to be sent from the baseband processor, transmitting a synchronization message using consecutive transmission bursts wherein each burst is transmitted at a different frequency. Note that a similar synchronization message is repeated in each of the bursts, i.e., 5 bursts as in the example presented hereinabove. The difference being a counter which counts the number of synchronization hops. The data packet is then encoded using an error correcting code such as a Reed-Solomon or convolutional code. The encoded packet is then split into a plurality of sub packets or into groups of symbols. The bit stream in each sub packet is differentially encoded and transmitted in consecutive transmission bursts wherein each burst is transmitted at a different frequency using DQPSK modulation.

With reference to FIG. 9, the first step is to set NO_FREQD and NO_FREQS to 1 (step 210). The last letter 'D' signifies the number of frequencies for the data packets and the last letter 'S' signifies the number of frequencies for synchronization packets. Messages are then received from the PC (step 212) and fragmented into a plurality of input packets each having a length of N1 bytes (step 214). Each input packet is then passed through a Reed-Solomon encoder which generates output packets of length N2 bytes (step 216). The value N2 represents the number of bytes/hop. Next, each output packet is fragmented into NHOPSD sub packets of length N2/NHOPSD number of bytes (step 218). The value NHOPSD representing the number of hops for the data packet.

In the next step, the frequency NO_FREQS is output to the synthesizer of local oscillator 104 (FIG. 5) (step 220).

The synchronization or preamble message is then output to the modulator (step 222). Step 220 dictates to the synthesizer the hop frequency to be used as generated by the pseudo random sequence generator 106. Then, the value NO_FREQS is incremented by 1 (step 224). If the frequency count NO_FREQS is greater than the number of hops NHOPSS (step 226) then the frequency NO_FREQD is then output to the synthesizer or local oscillator (step 228). Step 226 counts the number of preamble hops already taken and if the number of hops is greater than the number allowed then the data portion of message is transmitted. If the number of hops in the preamble has not exceeded the value NHOPSS then the next hop frequency is output to the synthesizer (step 220).

Once the output frequency NO_FREQD for the message data is output to the synthesizer using step 222 the next bit in the message is output to the modulator (step 230). It is then checked to see whether the packet has arrived (step 232). If not, the next bit is input to the modulator using step 230. This process continues until the end of the packet is reached at which time the value NO_FREQD is incremented by 1 (step 234). If the current frequency count has exceeded the number of hops NHOPSD for the message data, control then returns to step 210. If the frequency count has not exceeded the hop count, then the next frequency NO_FREQD is output through the synthesizer and the process repeats step 228.

Reverse Link Receiver

Figure 10:
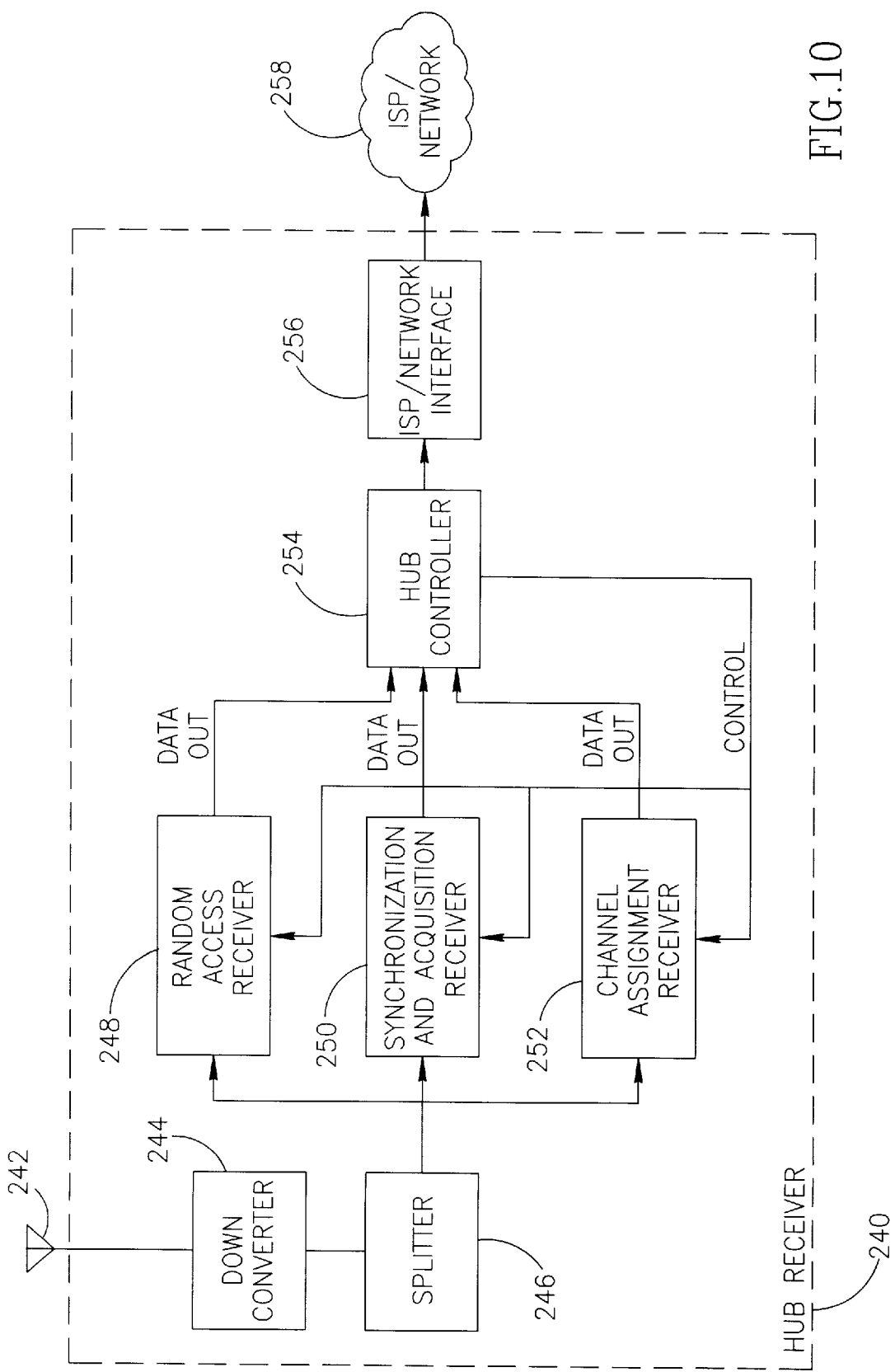
FIG. 10 is a high level block diagram illustrating the hub receiver portion of the communication system.

The receiver portion of the reverse length located in the hub will now be described in more detail. A high level block diagram of the hub receiver is shown in FIG. 10. The reverse link utilizes three types of receivers: two of the types for the random access mode and one type used for the channel assignment mode. The hub receiver, generally referenced 240, comprises an antenna 242 coupled to downconverter 244. The downconverter may comprise the Ku-band transceiver for satellite communications, model 3100 Series, manufactured by SierraCom, Massachusetts. The output of the downconverter is output to a splitter 246 which functions to split and share the down converted signal among the three different receivers. The three receivers used in the hub comprise the random access (RA) receiver 248, a synchronization and acquisition (SA) receiver 250 and a channel assignment (CA) receiver 252. The data output of each of the three receivers 248, 250, 252 is input to the hub controller 254. The output of the hub controller is then input to an ISP/network interface 256 which functions to interface the hub receiver 240 to a network such as an ISP or other communication network 258.

The synchronization and acquisition (SA) receiver 250 is used to receive the preamble/synchronization messages and functions to extract the synchronization information, i.e., frequency acquisition and timing acquisition related data. In addition, the synchronization messages contain user information. In particular, the hopping sequence for the data message which defines the frequencies which will be transmitted by the transmitter.

A plurality of synchronization and acquisition (SA) receivers are utilized in the hub receiver with one synchronization and acquisition receiver utilized for each of the possible frequencies to be received during a preamble portion of the message. Each SA receiver is tuned to a fixed frequency and waits for the arrival of a preamble/synchronization message. Thus, in the example given above, a subset of ten frequencies out of the total $N_F$ is allotted for use of preamble messages. Thus, in this example, 10 SA receivers are required each one tuned to one of the 10 frequencies in the subset of frequencies.

In order for the hub receiver 240 to acquire synchronization all that is needed is one of the synchronization messages transmitted by the transmitter to be received without any interference from other users. This is the purpose for sending the hop number within the synchronization message so that the SA receiver can know which out of the 5 hops (in this example) has been just received. In addition, the time the message data portion of the message begins transmission is also included in the preamble. This permits the hub controller 254 to determine when to begin looking for the start of the message data portion of the message.

The random access receiver 248 is used to receive the frequency hopping data portion of the message and detect the data therein. Note that the SA and the RA receiver constructed similarly. Thus, the following description applies to both the RA and the SA receivers. The RA receiver receives from the controller the hopping sequence that the user is using. The RA receiver functions to hop between the predefined frequencies contained in the hop sequence. In addition, the RA receiver functions to decode the received data using the Reed-Solomon decoder to extract the data.

Recall that requests for the CA mode of transmission are made over the RA communication link. In an alternative embodiment, a polling scheme may replace the RA transmission mode. In this embodiment, users are periodically polled using the forward link and asked whether they would like a CA mode channel. Using this polling scheme, the SA and the RA receivers may be replaced with a single receiver within the hub. Note that this embodiment is practical only when the number of users is not large.

Figure 11:
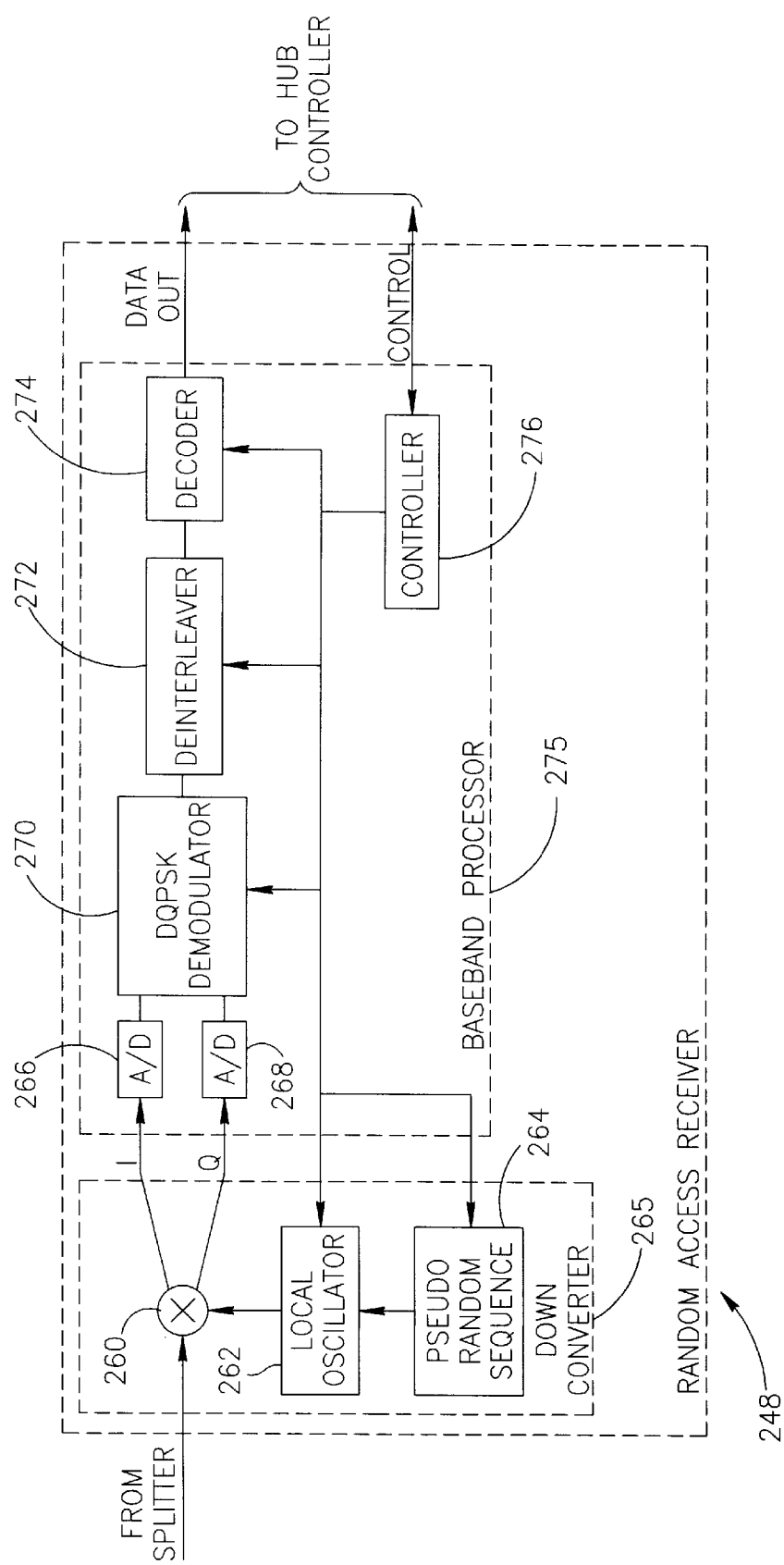
FIG. 11 is a high level block diagram illustrating the random access receiver of the communication system of the present invention.

The random access (RA) receiver 248 will now be described in more detail. A high level block diagram of the random access receiver is shown in FIG. 11. The signal output by the splitter 246 (FIG. 10) is input to a downconverter 265. The downconverter 265 comprises a mixer 260, a local oscillator 262 and pseudo random sequence generator 264. The mixer 260 may comprise the direct conversion IC model MAX2120 manufactured by MAXIM, Theale, Berks, UK. The local oscillator 262 can comprise the clean signal PLL model VDS-6000 manufactured by SCITEC, San Diego, Calif. A signal from the splitter is input to the mixer 260 which functions to mix the signal from the splitter with the signal output of the local oscillator 262. The pseudo random sequence generator 264 functions to generate the hop sequence in synchronization with the hop sequence used by the transmitter and the modem. The mixer 260 functions to generate an I and Q data stream which is then input to the baseband processor 275.

The baseband processor 275 comprises an A/D converter 266 for the I channel data and an A/D converter 268 for the Q channel data. The A/D converters may comprise the AD 775 manufactured by Analog Devices, Norwood, Mass. The respective outputs of the A/D converters 266, 268 are then output to DQPSK demodulator 270. The DQPSK demodulator may comprise the STEL 2120 manufactured by Stanford Telecom, Sunnyvale, Calif. The DQPSK demodulator demodulates the I and Q channels and generates an output data stream. The soft output of the demodulator 270 is input to a deinterleaver 272 which deinterleaves the data. The output of the deinterleaver is then decoded using decoder 274. Note that the operation of the decoder corresponds to that of the encoder 78 (FIG. 5) in the RA transmitter. The output of the decoder forms the output of the baseband processor 275 and is input to the hub controller 254. The baseband processor may comprise the 56002 DSP manufactured by Motorola, Inc.

The hub controller provides control and status signals to a controller 276 which functions to control the operation of the components making up the receiver 248. In particular, based on the particular hop sequence utilized by the transmitter as extracted from the preamble received by the SA receiver, the hub controller through the controller 276 directs the pseudo random sequence generator 264 to generate the proper sequence of frequencies for the local oscillator 262. Note that the local oscillator 262 can comprise a DDS for digitally synthesizing the local oscillator signals.

In an alternative embodiment, the Reed-Solomon decoding can have better performance by using knowledge of the hop sequence of each of the RA receivers in the hub to erase characters suspected to be erroneous. Recall that Reed-Solomon codes are capable of correcting both errors and erasures of RS characters. Erasures occur when the probability of errors are so high that the output characters cannot be determined and are simply omitted. In this case, the code is used to correct the erased characters. Decoding of RS codes with erasures have better performance.

Since the RA receivers operate in non synchronous fashion to each other, collisions in time and frequency are possible. During a hop period, there exists the potential for two RA receivers to be using the same frequency as described in connection with FIG. 2. Since the hub has knowledge of the hop sequence being used by each active RA receiver (by comparing the timing of the hop sequences), it can inform the Reed-Solomon decoder of a collision event. The decoder can use this knowledge of the collision to erase the particular characters effected or assign the soft decision output with a low reliability value. Based on the hop sequence collision information, the hub can instruct the two RA receivers effected to tag the output characters with a low reliability indication or erasures. The decoding process is described in more detail in Chapter 6 of the book "Reed-Solomon Codes and Their Applications", S. B. Wicker and V. K. Bhargava, IEEE Press, 1992.

Figure 12:
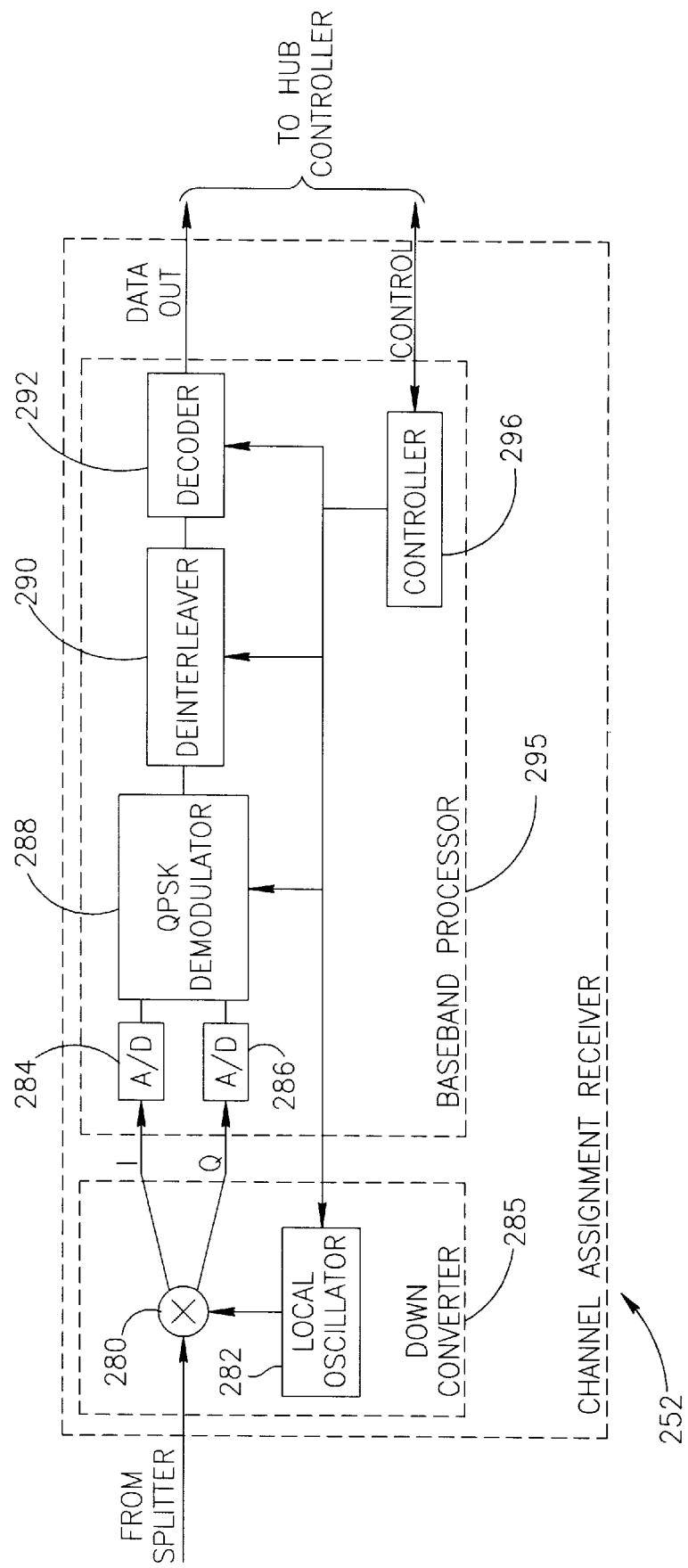
FIG. 12 is a high level block diagram illustrating the channel assignment receiver of the communication system.

The channel assignment (CA) receiver portion of the hub will now be described in more detail. A high level block diagram of the channel access receiver is shown in FIG. 12. The channel access receiver 252 comprises a downconverter 285 and a baseband processor 295. The signal from the splitter 246 (FIG. 10) is input to the downconverter 285 which comprises a complex mixer 280 and local oscillator 282. The mixer 280 functions to mix the signal from the splitter with the signal generated by the local oscillator 282 to generate a complex I and Q data stream. The I channel data is input to an A/D converter 284 and the Q channel data is input to an A/D converter 286. The A/D converters may comprise the AD 775 manufactured by Analog Devices, Norwood, Mass.

The respective outputs of both A/D converters 284, 286 are input to a QPSK demodulator 288. The QPSK demodulator 288 may comprise the STEL 2110A manufactured by Stanford Telecom, Sunnyvale, Calif. The soft output of the demodulator 288 is then deinterleaved by a deinterleaver 290. The output of the deinterleaver is then decoded utilizing decoder 292. Note that the operation of the decoder corresponds to that of the encoder 120 (FIG. 6) in the CA transmitter. The output of the decoder 292 forms the output of the channel receiver. The output data is input through the hub controller 254 which also functions to provide controlling status signals to a controller 286. The controller within the baseband processor 295 functions to control the operations of the channel assignment receiver 252.

Figure 13:
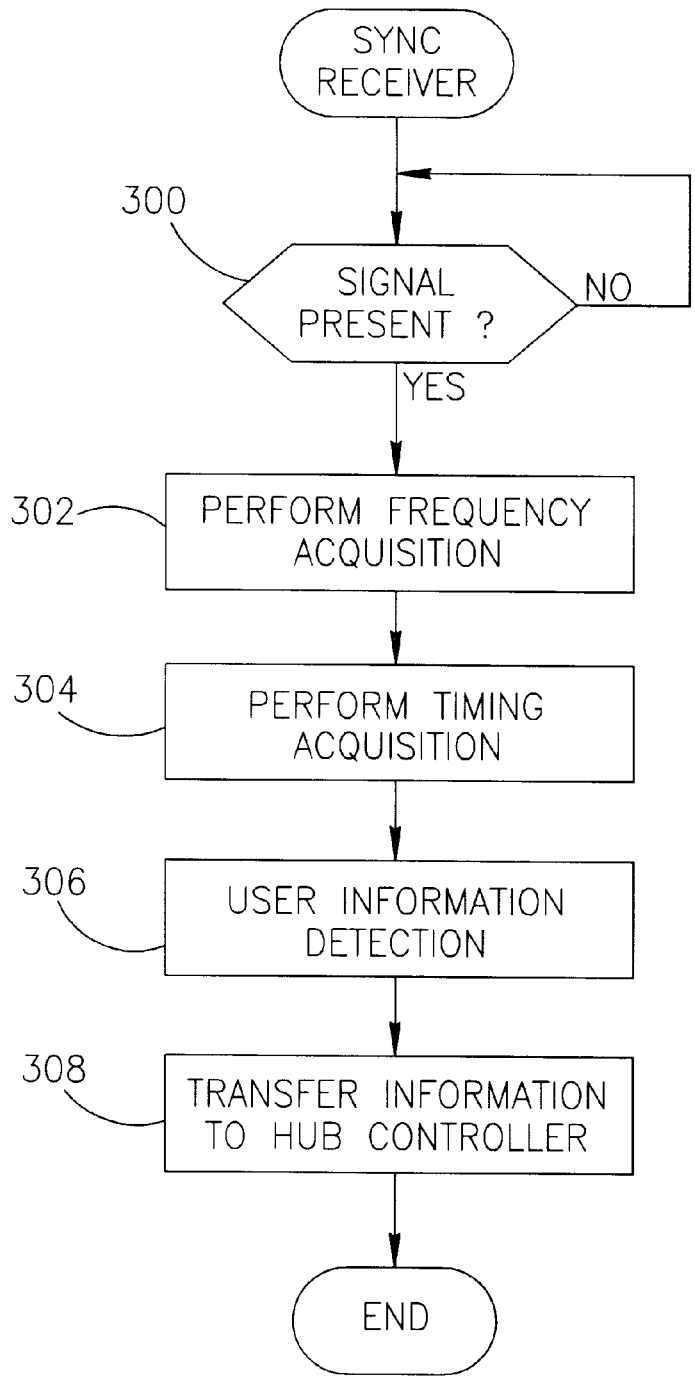
FIG. 13 is a high level flow diagram illustrating the synchronization receiver method of the present invention.

The method performed by the synchronization and acquisition receiver 250 (FIG. 10) will now be described in more detail. The high level flow diagram illustrating the SA receiver method is shown in FIG. 13. The first step is to wait for the signal to be present at the input of the SA receiver (step 300). Once a signal is detected, a frequency acquisition is then performed (step 302). Subsequently, timing acquisition is then performed (step 304) followed by detection of the user information contained in the preamble (step 306). The data contained in the preamble message is as described hereinabove. Next, the user information detected is transferred to the hub controller 254 (step 308). Once an SA receiver receives a preamble correctly, control is transferred to one of the RA frequency hopping receivers.

Note that the frequency and timing acquisition methods performed by the SA receiver are described in more detail in chapter 6 of R. Gitlin, J. Hayes, S. Weinstein, "Data Communication Principles," Plenum Press, New York.

Figure 14:
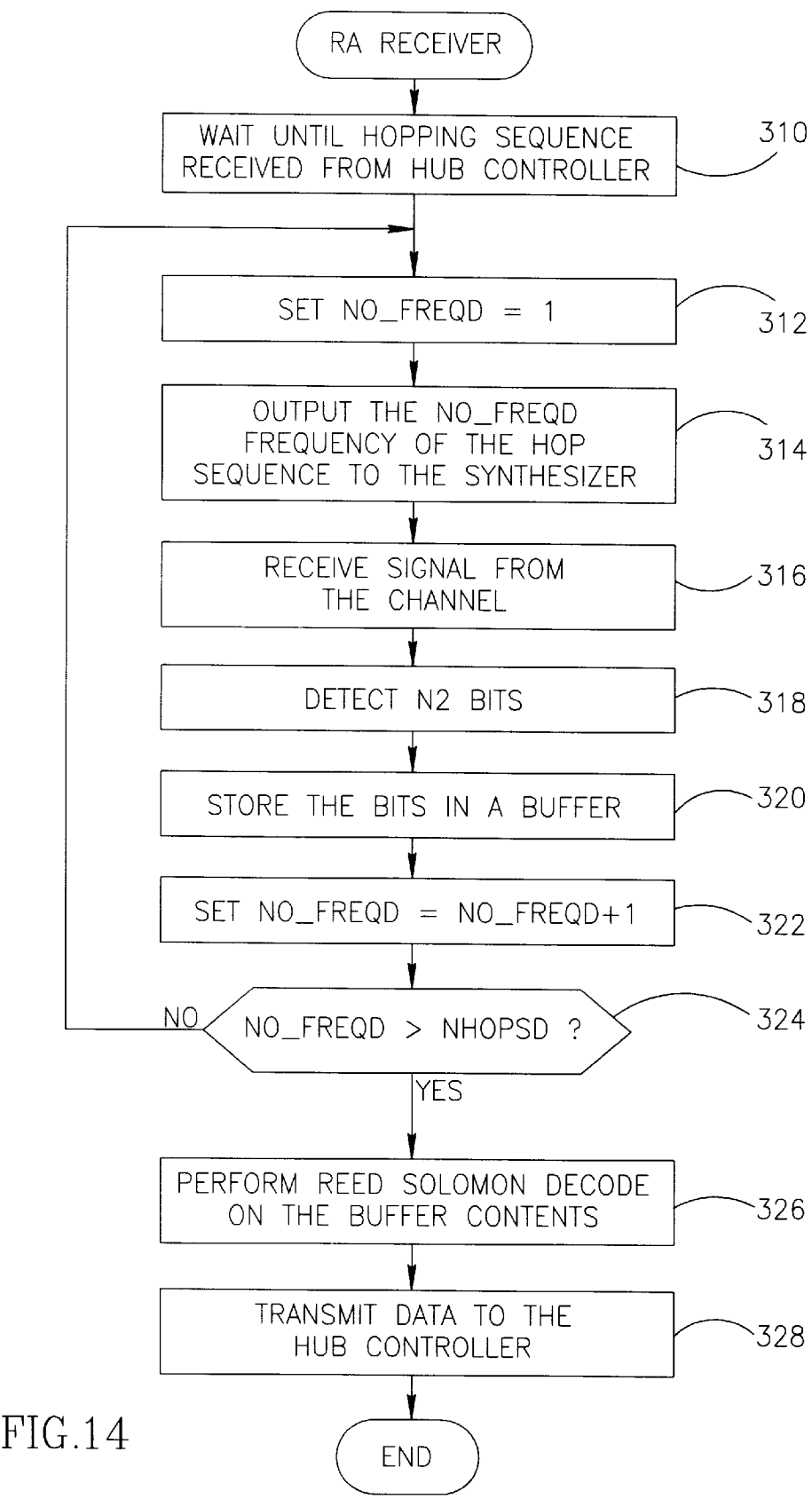
FIG. 14 is a high level flow diagram illustrating the random access receiver portion of the communication system of the present invention.

The method utilized by the random access receiver 248 (FIG. 10) in the hub receiver will now be described in more detail. A high level flow diagram illustrating the method remote access receiver is now shown in FIG. 14. The first step performed by the receiver is to wait for the reception of a hop sequence transmitted by the hub controller 254 (step 310). As described previously, the hop sequence is extracted from the preamble as received by the SA receiver. Next, the value NO_FREQD is set equal to 1 (step 312). Next, the value of the data frequency NO_FREQD of the hop sequence is output to the synthesizer or local oscillator 262 in the random access receiver (step 314). The signal is then received from the channel (step 316). The original N2 number of bytes transmitted is then detected (step 318). The bytes are then stored in a buffer (step 320) and the value NO_FREQD is incremented by 1 (step 322).

If the value NO_FREQD is less than or equal to the number of hops NHOPSD (step 324) then control returns to step 312. In this case there are still hops remaining within the data portion of the message. If the value NO_FREQD is greater than the number of hops NHOPSD then the reception of the message is complete. In the next step, Reed-Solomon decoding is performed on the contents of the buffer (step 326). Reed-Solomon codes are described in more detail in the book "Reed-Solomon Codes and Their Applications", S. B. Wicker and V. K. Bhargava, IEEE Press, 1992. Once decoded, the data is transmitted to the hub controller (step 328).

While the invention has been described with respect to a limited number of embodiments, it will be appreciated that many variations, modifications and other applications of the invention may be made.

What is claimed is:

1. A multiple access communications system for use in a satellite communication network, comprising:

a plurality of user terminals for generating data to be transmitted over said multiple access communication system;

at least one hub for receiving data over said multiple access communication system from said plurality of user terminals;

transmitter means within each user terminal for receiving data to be transmitted from said user terminal to said hub, said transmitter means including first communication means for transmitting short bursty data in combination with second communication means for continuous transmission of data;

switching means coupled to said transmitter means for switching transmission between said first communication means and said second communication means in accordance with predefined criteria, and receiver means within said at least one hub adapted to receive data transmitted by said plurality of terminals utilizing either said first communication means or said second communication means;

wherein said receiver means comprises:

means for receiving data transmitted by said plurality of user terminals using said first communication means, said first communication means utilizing non synchronous frequency hopping code division multiple access communications;

means for receiving data transmitted by said plurality of user terminals using said second communication means, said second communication means utilizing frequency division multiple access communications; and means for receiving preamble and synchronization message data transmitted by said plurality of user terminals precedent to transmissions utilizing said first communication means.

2. A multiple access communications system for use in a satellite communication network, comprising:

a plurality of user terminals for generating data to be transmitted over said multiple access communication system;

at least one hub for receiving data over said multiple access communication system from said plurality of user terminals;

transmitter means within each user terminal for receiving data to be transmitted from said user terminal to said hub, said transmitter means including first communication means for transmitting short bursty data in combination with second communication means for continuous transmission of data;

switching means coupled to said transmitter means for switching transmission between said first communication means and said second communication means in accordance with predefined criteria, and receiver means within said at least one hub adapted to receive data transmitted by said plurality of terminals utilizing either said first communication means or said second communication means;

wherein said switching means comprises means for switching from said first communication means to said second communication means when the length of a message received by said transmitter means exceeds a predetermined threshold.

3. A access communications system for use in a satellite communication network, comprising:

a plurality of user terminals for generating data to be transmitted over said multiple access communication system;

at least one hub for receiving data over said multiple access communication system from said plurality of user terminals;

transmitter means within each user terminal for receiving data to be transmitted from said user terminal to said hub, said transmitter means including first communication means for transmitting short bursty data in combination with second communication means for continuous transmission of data;

switching means coupled to said transmitter means for switching transmission between said first communication means and said second communication means in accordance with predefined criteria, and receiver means within said at least one hub adapted to receive data transmitted by said plurality of terminals utilizing either said first communication means or said second communication means;

wherein said switching means comprises means for switching transmission from said first communication means to said second communication means when a continuation flag in a message received by said transmitter means is turned on.

4. A multiple access communications system for use in a satellite communication network, comprising:

a plurality of user terminals for generating data to be transmitted over said multiple access communication system;

at least one hub for receiving data over said multiple access communication system from said plurality of user terminals;

transmitter means within each user terminal for receiving data to be transmitted from said user terminal to said hub, said transmitter means including first communication means for transmitting short bursty data in combination with second communication means for continuous transmission of data;

switching means coupled to said transmitter means for switching transmission between said first communication means and said second communication means in accordance with predefined criteria, and receiver means within said at least one hub adapted to receive data transmitted by said plurality of terminals utilizing either said first communication means or said second communication means;

wherein said switching means comprises means for switching transmission from said first communication means to said second communication means when a user buffer containing a plurality of messages to be sent via said transmitter means fills beyond predetermined level.

5. A multiple access communications system for use in a satellite communication network, comprising:

a plurality of user terminals for generating data to be transmitted over said multiple access communication system;

at least one hub for receiving data over said multiple access communication system from said plurality of user terminals;

transmitter means within each user terminal for receiving data to be transmitted from said user terminal to said hub, said transmitter means including first communication means for transmitting short bursty data in combination with second communication means for continuous transmission of data;

switching means coupled to said transmitter means for switching transmission between said first communication means and said second communication means in accordance with predefined criteria, and receiver means within said at least one hub adapted to receive data transmitted by said plurality of terminals utilizing either said first communication means or said second communication means;

wherein said switching means comprises means for switching transmission from said second communication means to said first communication means when the length of a message received by said transmitter means fails to exceed a predetermined threshold.

6. A multiple access communications system for use in a satellite communication network, comprising:

a plurality of user terminals for generating data to be transmitted over said multiple access communication system;

at least one hub for receiving data over said multiple access communication system from said plurality of user terminals;

transmitter means within each user terminal for receiving data to be transmitted from said user terminal to said hub, said transmitter means including first communication means for transmitting short bursty data in combination with second communication means for continuous transmission of data;

switching means coupled to said transmitter means for switching transmission between said first communication means and said second communication means in accordance with predefined criteria, and receiver means within said at least one hub adapted to receive data transmitted by said plurality of terminals utilizing either said first communication means or said second communication means;

wherein said switching means comprises means for switching transmission from said second communication means to said first communication means when a continuation flag in a message received by said transmitter means is turned off.

7. A multiple access communications system for use in a satellite communication network, comprising:

a plurality of user terminals for generating data to be transmitted over said multiple access communication system;

at least one hub for receiving data over said multiple access communication system from said plurality of user terminals;

transmitter means within each user terminal for receiving data to be transmitted from said user terminal to said hub, said transmitter means including first communication means for transmitting short bursty data in combination with second communication means for continuous transmission of data;

switching means coupled to said transmitter means for switching transmission between said first communication means and said second communication means in accordance with predefined criteria, and receiver means within said at least one hub adapted to receive data transmitted by said plurality of terminals utilizing either said first communication means or said second communication means;

wherein said switching means comprises means for switching transmission from said second communication means to said first communication means when the software application meeting a predetermined criteria that initiated a message to be transmitted via said transmitter means ceases to generate message data.

8. A multiple access communications system for use in a satellite communication network, comprising:

a plurality of user terminals for generating data to be transmitted over said multiple access communication system;

at least one hub for receiving data over said multiple access communication system from said plurality of user terminals;

transmitter means within each user terminal for receiving data to be transmitted from said user terminal to said hub, said transmitter means including first communication means for transmitting short bursty data in combination with second communication means for continuous transmission of data;

switching means coupled to said transmitter means for switching transmission between said first communication means and said second communication means in accordance with predefined criteria, and receiver means within said at least one hub adapted to receive data transmitted by said plurality of terminals utilizing either said first communication means or said second communication means; p1 wherein said at least one hub comprises collision detection means for determining when two frequency hops associated with two independent receivers are utilizing the same frequency at the same time, thus improving decoding within said receiver means.

9. A multiple access communication system for use in a satellite communication network, said satellite communication network including a plurality of user terminals and at least one hub, said system comprising:

first transmitter means for transmitting data utilizing a non synchronous frequency hopping code division multiple access communication scheme;

second transmitter means for transmitting data utilizing a frequency division multiple access communication scheme;

switching means for switching transmission between said first transmitter means and said second transmitter means in accordance with predefined criteria;

first receiver means for receiving data transmitted using utilizing said non synchronous frequency hopping code division multiple access communication scheme;

second receiver means for receiving data transmitted using said frequency division multiple access communication scheme; and third receiver means for receiving preamble and synchronization data transmitted utilizing said utilizing a non synchronous frequency hopping code division multiple access communication scheme.

10. The system according to claim 9, wherein said switching means comprises means for switching transmission from said first transmitter means to said second transmitter means in accordance with a source port field within messages received by said transmitter means.

11. The system according to claim 9, wherein said switching means comprises means for switching transmission from said first transmitter means to said second transmitter means when the length of a message received by said transmitter means exceeds a predetermined threshold.

12. The system according to claim 9, wherein said switching means comprises means for switching transmission from said first transmitter means to said second transmitter means when a continuation flag in a message received by said transmitter means is turned on.

13. The system according to claim 9, wherein said switching means comprises means for switching transmission from said first transmitter means to said second transmitter means when a user buffer containing a plurality of messages to be sent via said transmitter means fills beyond predetermined level.

14. The system according to claim 9, wherein said switching means comprises means for switching transmission from said first transmitter means to said second transmitter means in accordance with the type and nature of the software application that initiated a message to be transmitted via said transmitter means.

15. The system according to claim 9, wherein said switching means comprises means for switching transmission from said second transmitter means to said first transmitter means when a source port matching a predetermined criteria ceases to transmit messages.

16. The system according to claim 9, wherein said switching means comprises means for switching transmission from said second transmitter means to said first transmitter means when the length of a message received by said transmitter means fails to exceed a predetermined threshold.

17. The system according to claim 9, wherein said switching means comprises means for switching transmission from said second transmitter means to said first transmitter means when a continuation flag in a message received by said transmitter means is turned off.

18. The system according to claim 9, wherein said switching means comprises means for switching transmission from said second transmitter means to said first transmitter means when a user buffer containing a plurality of messages to be sent via said transmitter means empties.

19. The system according to claim 9, wherein said switching means comprises means for switching transmission from said second transmitter means to said first transmitter means when the software application meeting a predetermined criteria that initiated a message to be transmitted via said transmitter means ceases to generate message data.

20. The system according to claim 1, further comprising interface means for interfacing said at least one hub to an external communications network.

21. The system according to claim 20, wherein said external communications network comprises the Internet.

22. The system according to claim 20, wherein said external communications network comprises a packet switched telephone network (PSTN).

23. The system according to claim 20, wherein said external communications network comprises an Integrated Services Digital Network (ISDN).

24. The system according to claim 20, wherein said external communications network comprises a Community Antenna Television (CATV) network.

25. The system according to claim 20, wherein said external communications network comprises a Digital Subscriber Loop (xDSL).

26. The system according to claim 20, wherein said external communications network comprises a Frame Relay network.

27. The system according to claim 9, further comprising collision detection means for determining when two frequency hops associated with two independent receivers within said receiver means are utilizing the same frequency at the same time, thus improving decoding within said first receiver means.

28. A multiple access communications system for use in a satellite communication network, comprising:

a plurality of user terminals for transmitting and receiving data over said multiple access communication system;

at least one hub for transmitting and receiving data over said multiple access communication system to and from said plurality of user terminals;

a forward communication link for transmitting data from said at least one hub to said plurality of user terminals;

a return communication link for transmitting data from said plurality of user terminals to said at least one hub, said return communication link including a first communication means for transmitting short bursty data in combination with second communication means for continuous transmission of data;

switching means within said plurality of user terminals for switching transmission between said first communication means and said second communication means in accordance with predefined criteria; and receiver means within said at least one hub adapted to receive data transmitted by said plurality of terminals utilizing either said first communication means or said second communication means, wherein each user terminal comprises means for generating a request to be sent over said return communications link in order to utilize said second communication means.

29. A multiple access communications system for use in a satellite communication network, comprising:

a plurality of user terminals for transmitting and receiving data over said multiple access communication system;

at least one hub for transmitting and receiving data over said multiple access communication system to and from said plurality of user terminals;

a forward communication link for transmitting data from said at least one hub to said plurality of user terminals;

a return communication link for transmitting data from said plurality of user terminals to said at least one hub, said return communication link including a first communication means for transmitting short bursty data in combination with second communication means for continuous transmission of data;

switching means within said plurality of user terminals for switching transmission between said first communication means and said second communication means in accordance with predefined criteria; and receiver means within said at least one hub adapted to receive data transmitted by said plurality of terminals utilizing either said first communication means or said second communication means, wherein said at least one hub comprises means for polling each user terminal over said forward communication link as to whether said transmission of data should be switched to utilize said second communication means.

30. The system according to claim 9, further comprising interface means for interfacing said at least one hub to an external communications network.

31. The system according to claim 30, wherein said external communications network comprises the Internet.

32. The system according to claim 30, wherein said external communications network comprises a packet switched telephone network (PSTN).

33. The system according to claim 30, wherein said external communications network comprises an Integrated Services Digital Network (ISDN).

34. The system according to claim 30, wherein said external communications network comprises a Community Antenna Television (CATV) network.

35. The system according to claim 20, wherein said external communications network comprises a Digital Subscriber Loop (xDSL).

36. The system according to claim 20, wherein said external communications network comprises a Frame Relay network.

* * * * *